(12) United States Patent
Wu et al.

(10) Patent No.: US 12,381,478 B2
(45) Date of Patent: Aug. 5, 2025

(54) CIRCUITS AND METHODS TO STARTUP AND SHUTDOWN MULTI-LEVEL CONVERTERS

(71) Applicant: Murata Manufacturing Co., Ltd., Kyoto (JP)

(72) Inventors: Gary Chunshien Wu, San Diego, CA (US); Gregory Szczeszynski, Nashua, NH (US)

(73) Assignee: Murata Manufacturing Co., Ltd., Kyoto (JP)

( * ) Notice: Subject to any disclaimer, the term of this patent is extended or adjusted under 35 U.S.C. 154(b) by 267 days.

(21) Appl. No.: 18/322,330

(22) Filed: May 23, 2023

(65) Prior Publication Data

US 2024/0396434 A1  Nov. 28, 2024

(51) Int. Cl.
*H02M 1/36* (2007.01)
*H02M 3/07* (2006.01)

(52) U.S. Cl.
CPC .............. *H02M 1/36* (2013.01); *H02M 3/07* (2013.01)

(58) Field of Classification Search
CPC ........ H02M 1/08; H02M 1/36; H02M 7/4837; H02M 3/158
See application file for complete search history.

(56) References Cited

U.S. PATENT DOCUMENTS

| 8,971,080 | B2 * | 3/2015 | Weis | ................ | H02M 3/1588 |
| | | | | | 363/127 |
| 9,859,274 | B2 * | 1/2018 | Weis | ................ | H10D 84/834 |
| 10,686,367 | B1 | 6/2020 | Low | | |
| 10,720,842 | B1 | 7/2020 | Wu et al. | | |

(Continued)

FOREIGN PATENT DOCUMENTS

| EP | 4007153 A1 | 6/2022 |
| KR | 20210153280 A | 12/2021 |
| WO | WO 2016057878 A1 | 4/2016 |

OTHER PUBLICATIONS

Szczeszynski, Gregory, "Controlling Charge-Balance and Transients in a Multi-Level Power Converter", Application filed in the USPTO on Dec. 23, 2021, U.S. Appl. No. 17/560,767, 78 pgs.

(Continued)

*Primary Examiner* — Adolf D Berhane
*Assistant Examiner* — Afework S Demisse
(74) *Attorney, Agent, or Firm* — Haynes and Boone, LLP

(57) ABSTRACT

A circuit suitable for use with a multi-level power converter cell that (1) charges boot capacitors at startup to a sufficient level to power level shifters and drivers that control the power switches within the cell, (2) pre-charges each fly capacitor to a target voltage, (3) provides a shut-down and/or a standby mode of operation that enables a quick re-start of operation, and (4) balances fly capacitor voltages when the fly capacitor(s) is/are not actively charge-balanced. One embodiment includes a first switchable current source coupled between a fly capacitor and an input voltage; a second switchable current source coupled between the fly capacitor and a reference potential; and a third switchable current source coupled in parallel with the fly capacitor; wherein the switchable current sources are configured to charge the fly capacitor in a first mode of operation, and to discharge the fly capacitor in a second mode of operation.

17 Claims, 12 Drawing Sheets

(56) References Cited

U.S. PATENT DOCUMENTS

| | | |
|---|---|---|
| 10,720,943 B2 | 7/2020 | Wu et al. |
| 10,770,974 B2 | 9/2020 | Wu et al. |
| 10,992,226 B1 | 4/2021 | Aboueldahab et al. |
| 11,646,665 B2 * | 5/2023 | Wu .................. H02M 1/08 327/109 |
| 2018/0351549 A1 | 12/2018 | Weis et al. |
| 2019/0379287 A1 | 12/2019 | Zhang et al. |
| 2022/0416664 A1 | 12/2022 | Wu |
| 2023/0142335 A1 | 5/2023 | Szczeszynski |

OTHER PUBLICATIONS

Ye, Zichao et al., "Improved Bootstrap Methods for Powering Floating Gate Drivers of Flying Capacitor Multilevel Converters and Hybrid Switched-Capacitor Converters," Jun. 2020, vol. 35, No. 6, pp. 5965-5977, IEEE Transactions on Power Electronics.

* cited by examiner

CIRCUITS AND METHODS TO STARTUP AND SHUTDOWN MULTI-LEVEL CONVERTERS

BACKGROUND

(1) Technical Field

This invention relates to electronic circuits, and more particularly to controllers for multi-level power converters.

(2) Background

Many electronic products, particularly mobile computing and/or communication products and components (e.g., notebook computers, ultra-book computers, tablet devices, LCD and LED displays) require multiple voltage levels. For example, radio frequency (RF) transmitter power amplifiers may require relatively high voltages (e.g., 12V or more), whereas logic circuitry may require a low voltage level (e.g., 1-3V). Still other circuitry may require an intermediate voltage level (e.g., 5-10V).

Direct current power converters are often used to generate a lower or higher voltage from a common power source, such as a battery, solar cells, and rectified AC sources. Power converters which generate a lower output voltage level from a higher input voltage power source are commonly known as buck converters, so-called because the output voltage $V_{OUT}$ is less than the input voltage $V_{IN}$, and hence the converter is "bucking" the input voltage. Power converters which generate a higher output voltage level from a lower input voltage power source are commonly known as boost converters, because $V_{OUT}$ is greater than $V_{IN}$. Some power converters may be either a buck converter or a boost converter depending on which terminals are used for input and output. Some power converters may provide an inverted output.

FIG. 1 is a block diagram of a circuit that includes a prior art power converter 100. In the illustrated example, the power converter 100 includes a converter cell 102 and a controller 104. The converter cell 102 is configured to receive an input voltage $V_{IN}$ from a voltage source 106 (e.g., a battery) across terminals V1+, V1– (common), and transform the input voltage $V_{IN}$ into an output voltage $V_{OUT}$ across terminals V2+, V2– (common). The output voltage $V_{OUT}$ is generally coupled across an output capacitor $C_{OUT}$, across which may be connected a load 108 (would may also be represented as an equivalent resistance R).

The controller 104 receives a set of input signals and produces a set of output signals. Some of these input signals arrive along a signal path 110 connected to the converter cell 102. Some input signals carry information indicative of the operational state of the converter cell 102. The controller 104 generally also receives one or more external input/output signals I/O that may be analog, digital (encoded or direct signal lines), or a combination of both, and a clock/timing signal CLK. Based upon the received input signals, the controller 104 produces a set of control signals back to the converter cell 102 on the signal path 110 that control the internal components of the converter cell 102 (e.g., internal power switches, such as FETs, especially MOSFETs) to cause the converter cell 102 to convert $V_{IN}$ to $V_{OUT}$. Each power switch will generally have a level shifter and driver circuit coupled to a control input (e.g., the gate of a FET implementing the power switch) so as to enable switching the power switch ON or OFF based on a logic-level clock and/or control signal.

In some embodiments, an auxiliary circuit (not shown) may provide various signals to the controller 104 (and optionally directly to the converter cell 102), such as the clock signal CLK, the input/output signals I/O, as well as various voltages, such as a general system supply voltage $V_{DD}$ and a transistor bias voltage VBIAS.

One type of direct current power converter cell known as a multi-level or M-level power converter includes charge transfer capacitors as energy storage elements coupled by controlled power switches so as to transfer charge from $V_{IN}$ to $V_{OUT}$. Such charge transfer capacitors are commonly known as "fly capacitors" or "pump capacitors". Every time a fly capacitor is used (i.e., not bypassed), the electrical energy flowing through that fly capacitor generally will either charge it or discharge it.

One design challenge of multi-level power converter cells is charging boot capacitors at startup that power level shifters and drivers that control the power switches within such cells. Another challenge is charging each fly capacitor to a target voltage before normal switching operation commences. A third challenge is implementing a shut-down mode of operation and/or a standby mode of operation that enables a quick re-start of operation without the need to charge the boot capacitors or fly capacitors from a ground state. The present invention provides an effective, efficient, and compact circuit that meets these design challenges.

SUMMARY

The present invention encompasses an effective, efficient, and compact circuit suitable for use with a multi-level power converter cell that (1) charges boot capacitors at startup to a sufficient level to power level shifters and drivers that control the power switches within such cell, (2) charges each fly capacitor to a target voltage before normal switching operation commences, (3) provides a shut-down mode of operation and/or a standby mode of operation that enables a quick re-start of operation without the need to charge the boot capacitors or fly capacitors from a ground state, and (4) optionally provides proper fly capacitor voltage levels when the fly capacitor(s) is/are not actively charge-balanced.

One embodiment includes, for each of one or more fly capacitors, a first switchable current source coupled to the top plate of the fly capacitor and configured to be coupled to an input voltage; a second switchable current source coupled to the bottom plate of the fly capacitor and configured to be coupled to a reference potential; and a third switchable current source coupled between the top plate and the bottom plate of the fly capacitor; wherein the first, second, and third switchable current source are configured to charge the fly capacitor in a first mode of operation, and to discharge the fly capacitor in a second mode of operation.

Another embodiment encompasses circuit including an M-level power converter cell having a set of n power switches coupled in series and configured to be coupled between an input voltage and a reference potential, each power switch having a control gate, where M≥3 and n≥4; an output capacitor coupled to a node between an adjacent pair of the set of n power switches and to the reference potential; one or more fly capacitors coupled to the set of n power switches, each having a top plate and a bottom plate; a set of n driver circuits each coupled to the control gate of an associated one of the set of n power switches; a set of n boot capacitors each coupled to an associated one of the set of n driver circuits and having a top plate and a bottom plate; a set of n–1 startup charger circuits, each coupled in parallel with an associated one of the set of n boot capacitors, and to a supply voltage, and configured to provide charge to the associated one of the set of n boot capacitors in a first phase of startup operation; a diode ladder coupled to a supply voltage and including a set of n−1 diodes, each diode coupled between the top plate of an associated one of the set of n boot capacitors and the top plate of an adjacent one of the set of n boot capacitors, and configured to provide charge to the associated one of the set of n boot capacitors in a second phase of startup operation and during normal operation of the M-level power converter cell; a set of n−1 switches, each coupled in parallel with an associated one of the set of n−1 diodes and configured to selectively bypass the associated one of the set of n−1 diodes; and, for each of the one or more fly capacitors, a first switchable current source coupled to the top plate of the fly capacitor and configured to be coupled to the input voltage, a second switchable current source coupled to the bottom plate of the fly capacitor and configured to be coupled to the reference potential, and a third switchable current source coupled between the top plate and the bottom plate of the fly capacitor, wherein the first, second, and third switchable current source are configured to charge the fly capacitor in a first mode of operation, and to discharge the fly capacitor in a second mode of operation.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses an effective, efficient, and compact circuit suitable for use with a multi-level power converter cell that (1) charges boot capacitors at startup to a sufficient level to power level shifters and drivers that control the power switches within such cell, (2) charges each fly capacitor to a target voltage before normal switching operation commences, (3) provides a shut-down mode of operation and/or a standby mode of operation that enables a quick re-start of operation without the need to charge the boot capacitors or fly capacitors from a ground state, and (4) optionally provides proper fly capacitor voltage levels when the fly capacitor(s) is/are not actively charge-balanced.

Example Embodiment

Figure 1:
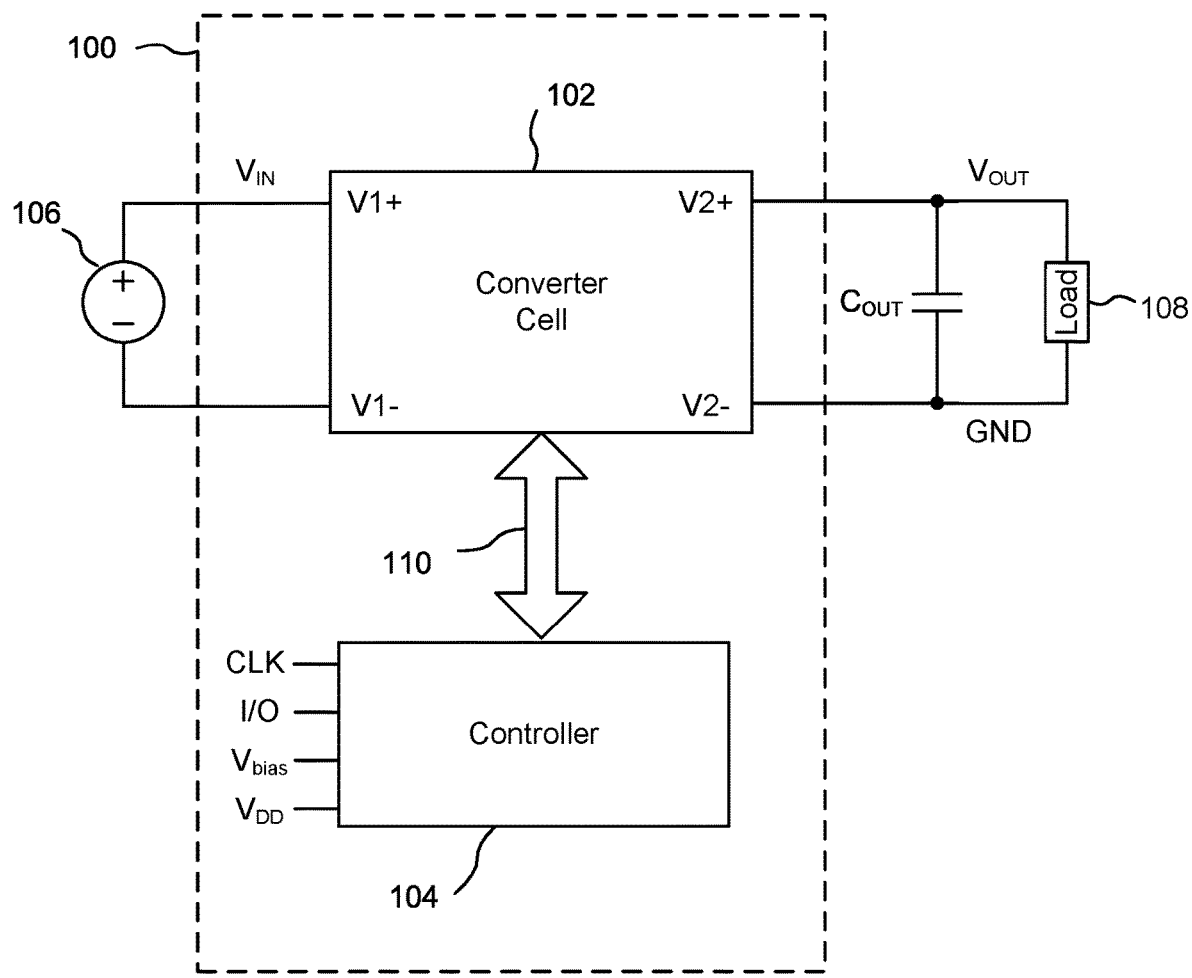
FIG. 1 is a block diagram of a circuit that includes a prior art power converter.
Figure 2A:
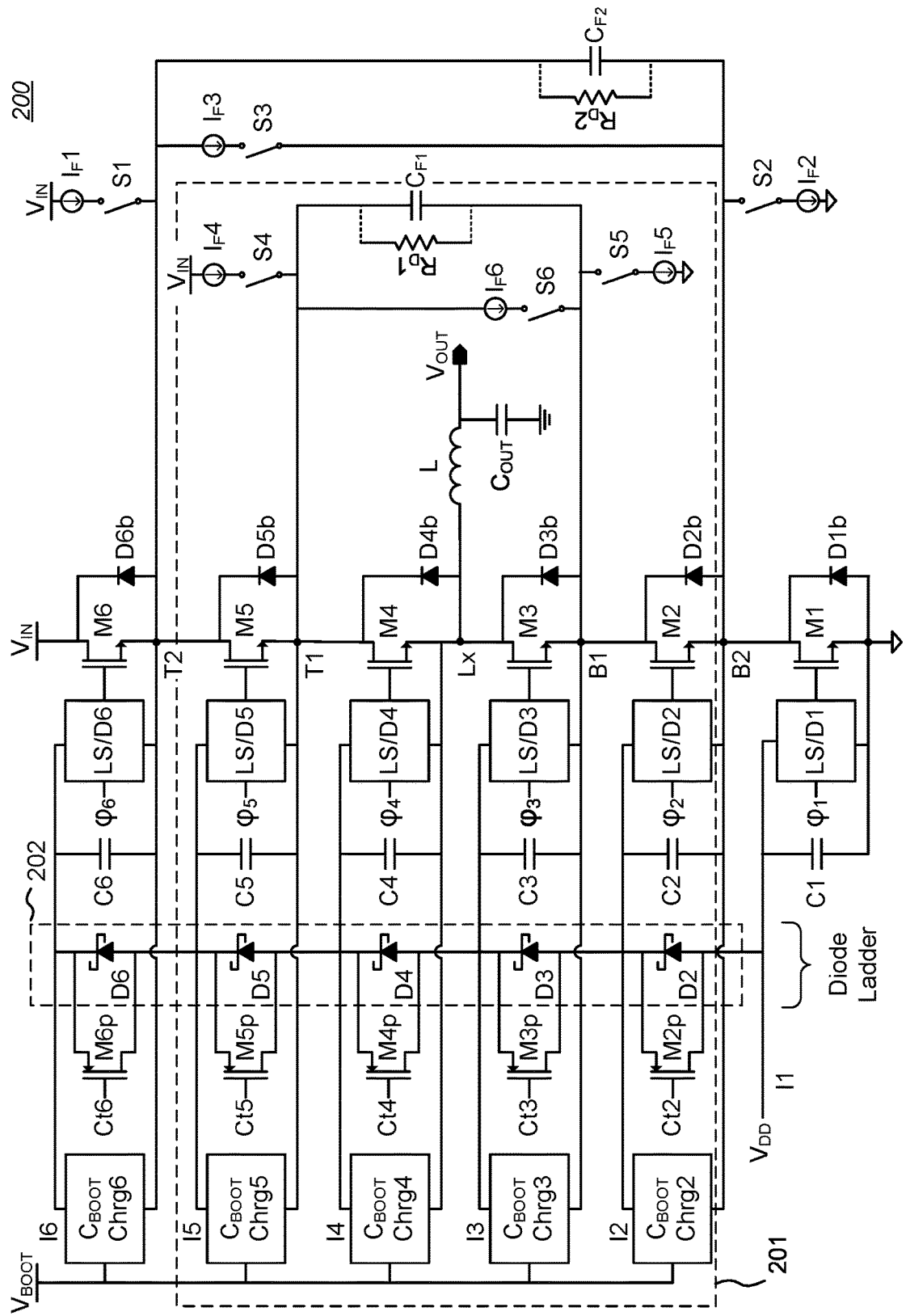
FIG. 2A is a schematic diagram of a 4-level DC-to-DC buck converter cell that represents one embodiment of the present invention.

FIG. 2A is a schematic diagram of a 4-level DC-to-DC buck converter cell 200 that represents one embodiment of the present invention. The illustrated converter cell 200 may be used as the converter circuit 102 of FIG. 1. If current flow through the converter cell 200 is reversed, the circuit will function as a boost converter. The invention is also adaptable for use in a number of other converter cell topologies, including buck-boost, resonant, Cuk, SEPIC, Forward, and Full-Bridge configurations. Note that nested within the 4-level DC-to-DC buck converter cell 200 is a 3-level DC-to-DC buck converter cell 201, encompassed by dashed lines. When configured as a 3-level converter cell, $V_{IN}$ would be applied directly to power switch M5 and power switch M2 would be coupled to a reference potential (e.g., circuit ground) and have the same drive setup as power switch M1 in the 4-level configuration (thus, M2p, D2, and $C_{BOOT}$ CHRG2 can be eliminated).

In multi-level power converter cells, it is common to utilize N-type MOSFETs (NFETs) for the power switches because NFETs are characterized by a much lower (better) $R_{ON} \times Q_G$ figure of merit compared to P-type MOSFETs (PFETs), where $Q_G$ is the total gate charge required to turn ON a FET to achieve a specified $R_{ON}$. In the illustrated example, a set of NFET power switches M1-M6 (generically, Mn, where n≥4) is series-coupled between $V_{IN}$ and a reference potential (e.g., circuit ground or 0V relative to $V_{IN}$). Each NFET power switch Mn is shown as including an inherent body diode D1b-D6b (generically, Dnb) coupled anode-to-source and cathode-to-drain with respect to the associated NFET power switch Mn.

In the example of FIG. 2A, an inductor L is coupled between an output capacitor $C_{OUT}$ and a node $L_X$ between adjacent NFET power switches M3 and M4. The node $L_X$ (and hence the inductor L) is bracketed by two sets of the NFET power switches, M1-M3 and M4-M6. The first set of NFET power switches M1-M3 coupled between node $L_X$ and circuit ground are "low-side" or "bottom-side" switches, while the second set of NFET power switches M4-M6 coupled between node $L_X$ and $V_{IN}$ are "high-side" or "top-side" switches. Each adjacent pair of power switches in the first and second sets of NFET power switches is separated by a respective node. The node between each adjacent pair of NFET power switches in one set is coupled by a corresponding fly capacitor $C_{Fx}$ to the corresponding node between each pair of NFET power switches in the other set. For example, in FIG. 2A, node T1 ("T" for "top") between NFET power switches M5 and M4 is coupled by fly capacitor $C_{F1}$ to node B1 ("B" for "bottom") between NFET power switches M3 and M2. Similarly, node T2 between NFET power switches M6 and M5 is coupled by fly capacitor $C_{F2}$ to node B2 between NFET power switches M2 and M1. The pattern of NFET power switches Mn and fly capacitors $C_{Fx}$ repeats for higher orders of M-level converters (e.g., 5-level, 6-level, etc.), where M≥3.

The multi-level converter cell 200 converts an input voltage $V_{IN}$ to an output voltage $V_{OUT}$ across output capacitor $C_{OUT}$ by actively switching the series-connected NFET power switches M1-M6 in response to corresponding pulse-width modulated (PWM) clock signals $\varphi_1$-$\varphi_6$ (generically, "$\varphi_n$"). Controlling clock signals for each set of power switches (i.e., high-side switches and low-side switches) are complementary and are provided by a control circuit (see, for example, FIG. 4). The state transition patterns of the power switches determine operational zones for the multi-level converter cell 200 and corresponding $V_{OUT}$ ranges.

Bootstrap Capacitors and Level Shifting/Driver Circuitry

A downside of using NFETs in a switching power converter is that NFETs are referenced to their source, which is the low voltage side of a power converter. One way of providing a suitable gate bias for each NFET power switch Mn and power to associated driver circuitry (and level shifter circuitry, if present) is by using bootstrap capacitors. A bootstrap capacitor is coupled to the source and gate (through a driver) of an associated NFET power switch Mn and, in operation, is charged to a voltage that is sufficient to enable switching of the gate of that power switch to an ON state.

For example, in FIG. 2A, the control gate of each NFET power switch Mn is coupled to the output of a corresponding level-shifter/driver circuit LS/D1-LS/D6 (generically, "LS/Dn"), although in some cases level shifting circuitry may not be required. A logic-level clock signal $\varphi_n$ coupled as an input to an associated LS/Dn circuit controls the ON or OFF state of the corresponding NFET power switch Mn. The clock signals may be generated, for example, by the control circuitry 400 shown in FIG. 4 below. In the illustrated example, each LS/Dn circuit is coupled in parallel with an associated boot capacitor C1-C6 (generically, "Cn"). Note that C1 is an optional element, but it is generally a good practice to have a supply bypass capacitor like C1 placed close to a circuit where a large amount of current may be drawn. After being charged during startup to a sufficient level, the boot capacitors Cn provide power to the associated LS/Dn circuits; such charging occurs before turning ON any of the NFET power switches Mn.

Figure 3A:
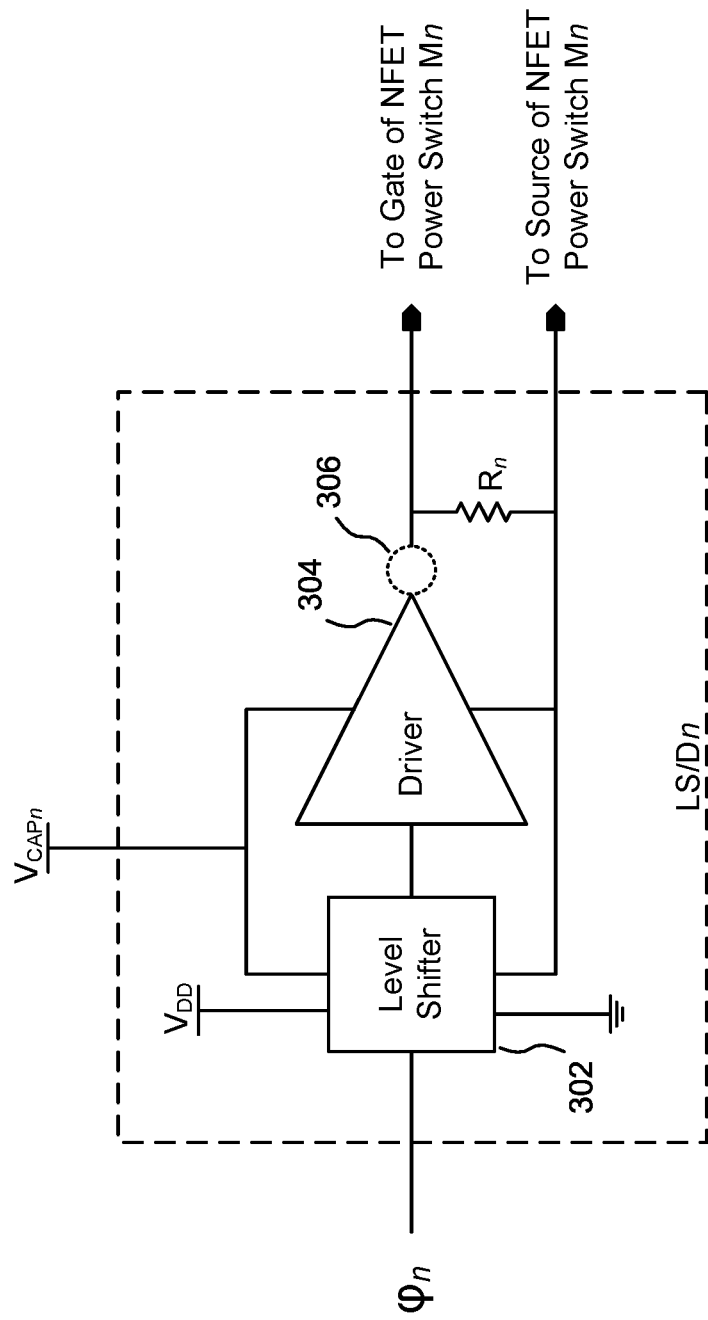
FIG. 3A is a more detailed block diagram of one embodiment of an LS/Dn circuit suitable for use with the circuit of FIG. 2A.

FIG. 3A is a more detailed block diagram of one embodiment of an LS/Dn circuit suitable for use with the circuit of FIG. 2A. An input clock signal $\varphi_n$ is applied to the input of a level shifter 302 that is coupled to a general system supply voltage $V_{DD}$ and to the voltage $V_{CAPn}$ across an associated boot capacitor Cn, as well as to a local reference potential (the source of an associated NFET power switch Mn). The voltage $V_{CAPn}$ may be, for example, about 5V above the local reference potential. A level shifter translates an input signal from one voltage domain (e.g., digital logic voltages) to another voltage domain (e.g., transistor control voltages). The output of the level shifter 302 thus follows the input clock signal $\varphi_n$ but in a different voltage range.

The output of the level shifter 302 is applied to the input of a driver 304 that is coupled to the voltage $V_{CAPn}$ across an associated boot capacitor Cn, as well as to a local reference potential (the source of an associated NFET power switch Mn). The level shifter 302 may have either a non-inverting or an inverting output (as indicated by the dotted circle 306) that is coupled to the gate of an associated NFET power switch Mn (remembering that the high-side NFET power switches and the low-side NFET power switches receive complementary control clock signals, hence the need for the different output polarities). In some embodiments, the driver 304 may comprise one or more inverters or buffers, and the number of constituent inverters and/or buffers within the driver 304 may be adjusted to accommodate signal delay requirements of a particular application. In general, it is useful to design the driver 304 so that it may be placed into a high impedance (high-Z) output state.

An optional resistor Rn may be coupled between the output of the driver 304 (and hence also to the gate of the associated NFET power switch Mn) and the local reference potential (and hence also to the source of the associated NFET power switch Mn). The resistor Rn preferably has a reasonably high resistance (e.g., 100 kΩ or more) that does not interfere with normal control of the associated power switch Mn by the LS/Dn circuit, but allows draining of charge from the gate of the associated NFET power switch Mn to maintain that power switch in an OFF state. This capability is useful by creating a known system state (i.e., a default OFF state for the NFET power switches Mn) if the driver 304 is not fully powered and operational or if the corresponding LS/Dn circuit is placed in a high-Z state.

As noted above, power to each LS/Dn circuit is provided by charge stored on a corresponding bootstrap capacitor Cn (in this example, n=1 ... 6) coupled to a $V_{CAPn}$ voltage input of the LS/Dn circuit. Each bootstrap capacitor Cn is preferably sized to provide at least sufficient charge, with minimal voltage drop, to allow the associated LS/Dn circuit to switch the state of the associated NFET power switch Mn (the control gates of which are relatively large capacitive structures). Generally, each bootstrap capacitor Cn loses charge in switching the gate of the associated NFET power switch Mn. Further, the bootstrap capacitors Cn lose charge even when not switching an associated power switch, such as through DC current drain from other connected circuitry (e.g., bias currents for analog circuits). Accordingly, the bootstrap capacitors Cn need to be charged during startup and periodically recharged during normal operation to replenish lost charge.

Startup Bootstrap Capacitor Charging Circuitry

One aspect of the present invention is providing an initial charge to the boot capacitors Cn at startup of the converter cell 200. At startup with $V_{IN}$=0V and with the bootstrap capacitors Cn discharged, there is insufficient power provided to the LS/Dn circuits to enable controlling the ON and OFF states of the NFET power switches Mn. To charge the bootstrap capacitors Cn, a startup charger circuit $C_{BOOT}$ Chrgn is coupled in parallel with a corresponding bootstrap capacitor Cn. Each $C_{BOOT}$ CHRGn circuit is coupled to a supply voltage $V_{BOOT}$, which may be $V_{IN}$ if $V_{IN}$ is sufficiently high (e.g., over 12V) or otherwise may be $V_{IN}$+$V_{DD}$, typically provided by a charge pump circuit (not shown). Each $C_{BOOT}$ CHRGn circuit also provides a current path for the charging current to flow away from the bottom plate of the corresponding bootstrap capacitor Cn to a ground potential so that the charging current does not flow to the fly capacitors $C_{Fx}$ or to the output capacitor $C_{OUT}$.

Figure 3B:
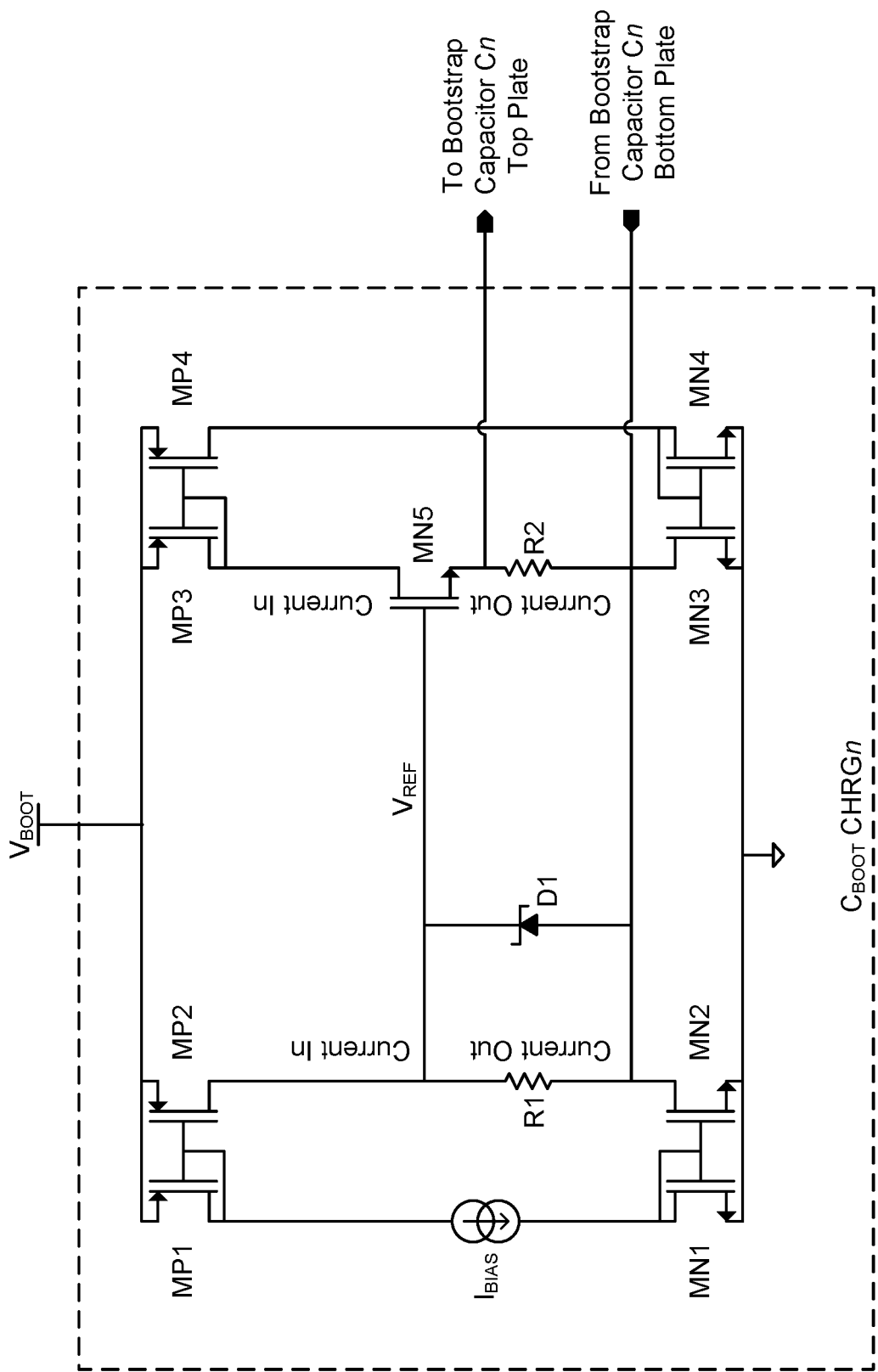
FIG. 3B is a schematic diagram of one embodiment of a startup bootstrap capacitor charging circuit, $C_{BOOT}$CHRGn, suitable for use with the circuit of FIG. 2A.

FIG. 3B is a schematic diagram of one embodiment of a startup bootstrap capacitor charging circuit, $C_{BOOT}$CHRGn, suitable for use with the circuit of FIG. 2A. $V_{BOOT}$ is typically set to $V_{IN}+V_{DD}$ by a charge pump. For example, if $V_{IN}$ is 12V and $V_{DD}$ is 5V, the $V_{BOOT}$ would be 17V. The illustrated circuit works like a floating charger for a bootstrap capacitor Cn, where the voltage on Cn can "float" to voltages between just below $V_{BOOT}$ to just above ground (GND).

FETs MP1 and MP2 form a first current mirror, FETs MN1 and MN2 form a second current mirror, FETs MP3 and MP4 form a third current mirror, and FETs MN3 and MN4 form a fourth current mirror. The illustrated circuit works by creating a reference voltage $V_{REF}$ across diode D1, which may be, for example, a 5V Zener diode. More specifically, FET MP2 sends bias current into resistor R1 and diode D1 to bias diode D1 at the target reference voltage $V_{REF}$. FET MN2 returns this current to GND so that the bias current does not flow into the bootstrap capacitor Cn through the bottom plate of the bootstrap capacitor Cn.

The reference voltage $V_{REF}$ would generate a steady state voltage across resistor R2 that is approximately 5V–($V_{GS}$ of FET MN5). If a bootstrap capacitor Cn connected in parallel with resistor R2 is initially discharged at 0V, the $V_{GS}$ of MN5 would initially be at 5V, which causes MN5 to turn ON and draw current from $V_{BOOT}$ through FET MP3. This current gets mirrored through FETs MP4, MN4, and MN3, which allows the charging current for the bootstrap capacitor Cn to return to ground through MN3. The bootstrap capacitor Cn is charged to a maximum of 5V–($V_{GS}$ of MN5). If no current is being drawn from the bootstrap capacitor Cn, the steady state voltage on the bootstrap capacitor Cn is roughly 5V–$V_{THN}$ (where $V_{THN}$ is the threshold voltage of an NMOS device). As shown in FIG. 2A, the system supply voltage $V_{DD}$ provides a current I1, and each $C_{BOOT}$CHRGn circuit provides a respective current I2-I6.

In the preferred embodiment, the $C_{BOOT}$CHRGn circuits are designed to initially charge the bootstrap capacitors Cn at startup to a voltage less than the voltage provide by the normal operation diode ladder described below, but still sufficient to power the LS/Dn circuits controlling the ON/OFF state of the of the corresponding NFET power switches Mn. During normal operation, the diode ladder would charge the bootstrap capacitors Cn to a high enough voltage to cut-off current passing through FET MN5. Thus, during normal operation, the more efficient charging circuitry of the diode ladder is used.

Of note, the $C_{BOOT}$CHRGn circuits operate automatically based on analog voltages, and do not require affirmative control or timing signals from a controller.

Diode Ladder Bootstrap Capacitor Recharging Circuitry

While the $C_{BOOT}$CHRGn circuits adequately provide an initial charge for the bootstrap capacitors Cn, the current provided by the $C_{BOOT}$ CHRGn circuits is relatively low, and hence charging time may be slow. This may be an acceptable characteristic at startup, but in some applications, the low current may not suffice to timely recharge the bootstrap capacitors Cn during normal operation. Accordingly, embodiments of the present invention may be enhanced to provide improved recharging characteristics.

In particular, the bootstrap capacitors Cn may be recharged during normal switching operation of the converter cell 200 by providing a ladder 202 of series-coupled diodes D2-D6 (generically, Dn) between a system supply voltage $V_{DD}$ and the top plate of the top-most bootstrap capacitors (C6 in the example of FIG. 2A). Each diode Dn in the ladder 202 has its cathode coupled to the top plate of a respective bootstrap capacitor Cn and its anode coupled to the top plate of a next "lower" bootstrap capacitor Cn-1. Thus, diode D2 is coupled between the top plates of C2 and C1; diode D3 is coupled between the top plates of C3 and C2; diode D4 is coupled between the top plates of C4 and C3; diode D5 is coupled between the top plates of C5 and C4; and diode D6 is coupled between the top plates of C6 and C5. In addition, the anode of the lowest diode, D2, is coupled to the system supply voltage $V_{DD}$. Note that there is no diode "D1", since bootstrap capacitor C1 may be charged directly by the system supply voltage $V_{DD}$; thus, for n power switches Mn, there are n–1 diodes Dn in the diode ladder 202. The diodes Dn are preferably Schottky diodes, as illustrated, which have a smaller forward-bias voltage drop compared to conventional diodes.

Whenever an NFET power switch Mn is ON (conducting), that power switch connects the bottom plate of the next-higher bootstrap capacitor to the bottom plate on its own associated bootstrap capacitor, so in a sense the two bootstrap capacitors "fly" together to the same voltage level. Conversely, whenever an NFET power switch Mn is OFF (non-conductive or blocking), the bottom plates of those two adjacent bootstrap capacitors would be disconnected and thus "fly" apart to different voltage levels.

With the configuration shown in FIG. 2A, and in normal post-startup operation, the lowest bootstrap capacitor C1 is continually charged by $V_{DD}$; C2 is charged by $V_{DD}$ through diode D2 when M1 is closed (conducting); C3 is charged by C2 through diode D3 when M2 is closed; C4 is charged by C3 through diode D4 when M3 is closed; C5 is charged by C4 through diode D5 when M4 is closed; and C6 is charged by C5 through diode D6 when M5 is closed.

Without additional circuitry, a problem that arises is that each successive higher diode incurs a forward-bias voltage drop that reduces the available charging voltage. For example, bootstrap capacitor C5 would see 4 diode voltage drops across diodes D2-D5, plus a capacitor charge redistribution voltage drop. Assuming that $V_{DD}$=5V, a Schottky diode forward-bias voltage drop of about 0.5V, and a charge redistribution voltage drop of about 0.3V, then C2 would charge at a maximum of about 4.2V, C3 would charge at a maximum of about 3.4V, C4 would charge at a maximum of about 2.6V, and C5 would charge at a maximum of only about 1.8V. Such voltages may not be enough for the corresponding LS/Dn circuit to switch the associated NFET power switch Mn. The lower voltage available for higher tiers of bootstrap capacitors (e.g., C5 and C6) also results in larger switching delays for the associated buffer circuits, which may increase deadtime in the clock circuitry generating the clock signals φn, thus limiting the switching rate of the converter cell 200. The lower voltage available for higher tiers of bootstrap capacitors also makes the power switch NFETs more resistive (higher $R_{ON}$), and thus less efficient, due to a lower $V_{GS}$ provided by the LS/Dn's.

Additional circuitry encompassed by the present invention overcomes the shortcomings of a diode-only charging technique for a multi-level converter. More specifically, P-type FETs (PFETs) M2p-M6p (generically, "Mnp") are coupled in parallel with corresponding diodes Dn in the ladder 202. The PFETs Mnp, which may be relatively small compared to the NFET power switches Mn, are set to ON (conductive) or OFF (non-conductive) states controlled by corresponding signals Ct2-Ct6 (generically, "Ctn") from, for example, the control circuitry 400 shown in FIG. 4 below. The PFETs Mnp work in parallel with the diodes Dn. A diode Dn conducts when the voltage difference between two adjacent boot capacitors (e.g., Cn-1 and Cn) is greater than the diode voltage drop. Below the diode voltage drop, the parallel PFET Mnp, when switched ON, provides a conduction path between the two adjacent boot capacitors. In either case, the parallel elements provide for charge redistribution between the adjacent boot capacitors.

Fly Capacitor Charge and Discharge Circuitry

The $C_{BOOT}$ CHRGn circuits serve to initially charge the bootstrap capacitors Cn, and the diodes Dn serve to full charge and also re-charge the bootstrap capacitors Cn. Once the bootstrap capacitors Cn are charged during startup, a next phase of the startup process encompasses charging the fly capacitors $C_{Fx}$. Additional circuitry in the converter cell 200 provides that function.

Referring to FIG. 2A, sets of fly capacitor switchable current sources comprising a current source $I_Fx$ and a corresponding series-coupled switch Sx (collectively referred to as "$I_Fx/Sx$") are coupled between $V_{IN}$ and a reference potential (e.g., circuit ground). A source different from $V_{IN}$ may be used as long as the separate source has a higher potential on top under any conditions and lower potential at the bottom under any conditions; $V_{IN}$ and circuit ground meet those requirements. More specifically, switchable current source $I_F1/S1$ is coupled between $V_{IN}$ and the top plate of fly capacitor $C_{F2}$, switchable current source $I_F2/S2$ is coupled between the bottom plate of fly capacitor $C_{F2}$ and the reference potential, and switchable current source $I_{F3}S3$ is coupled in parallel with fly capacitor $C_{F2}$.

Similarly, switchable current source $I_F4/S4$ is coupled between $V_{IN}$ and the top plate of fly capacitor $C_{F1}$, switchable current source $I_F5/S5$ is coupled between the bottom plate of fly capacitor $C_{F1}$ and the reference potential, and switchable current source $I_{F6}/S6$ is coupled in parallel with fly capacitor $C_{F1}$.

Thus, more generally, each fly capacitor $C_{Fx}$ has three associated switchable current sources IFx/Sx, with two sets being coupled in series with a respective terminal of an associated fly capacitor $C_{Fx}$ (with a first set configured to be coupled to $V_{IN}$ and a second set configured to be coupled to the reference potential), and the third set being coupled in parallel with the associated fly capacitor $C_{Fx}$.

In some embodiments, the current sources $I_Fx$ (especially current sources $I_F3$ and $I_F6$) may be implemented as resistors. The switches Sx may be implemented as small, low-power FETs having minimal drive requirements. Optional high-value (e.g., 100's of kiloohms to megaohms) discharge resistors $R_D1$ and $R_D2$ may be coupled in parallel with the fly capacitors $C_{F1}$ and $C_{F1}$, respectively, as indicated by the dotted connection lines. $R_D1$ and $R_D2$ help ensure that after shutdown, fly capacitors $C_{F1}$ and $C_{F2}$ will be discharged to 0V.

Figure 2B:
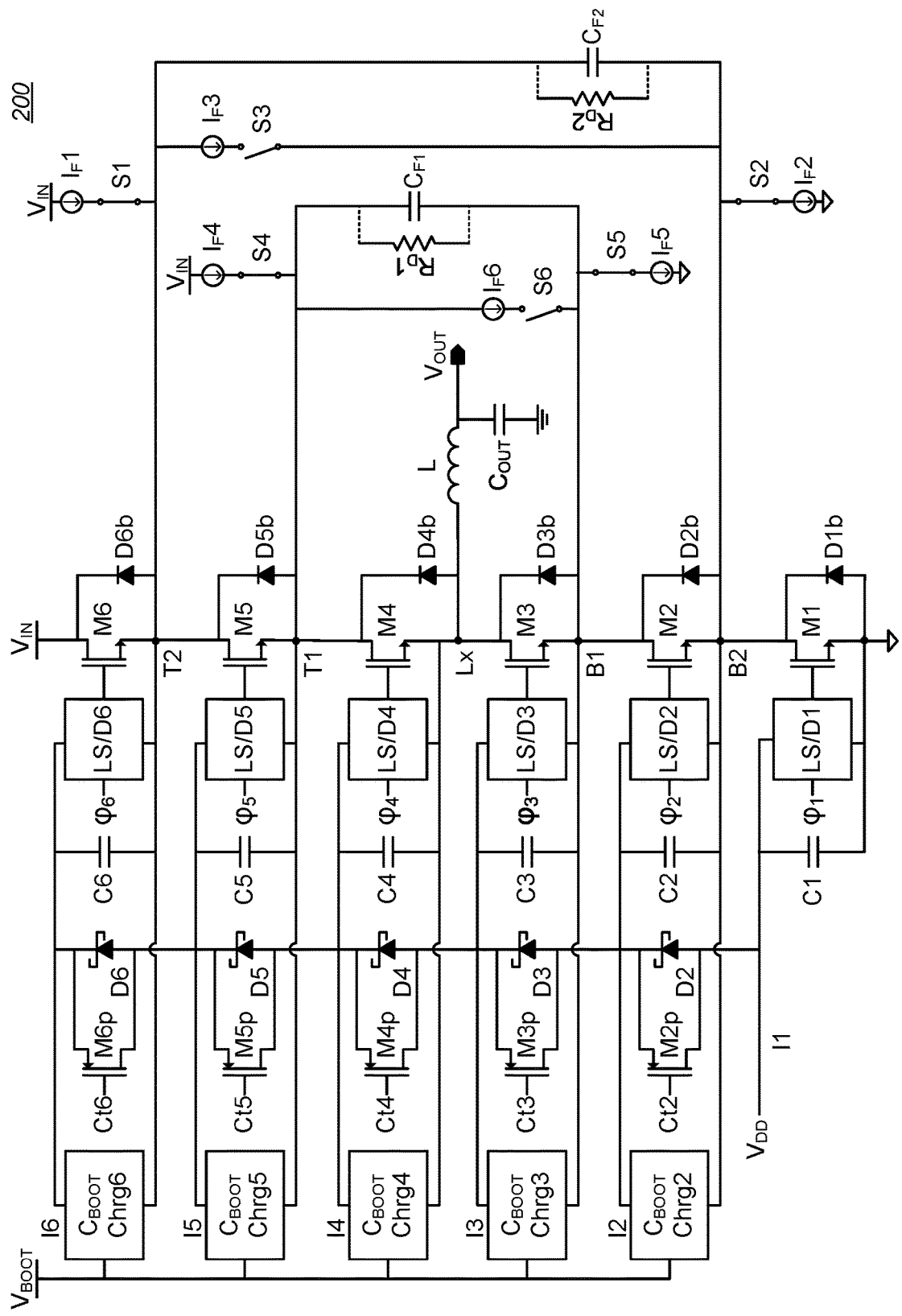
FIG. 2B is a schematic diagram showing the circuit of FIG. 2A in a first switch state that charges the fly capacitors $C_{Fx}$.

If constant current draw is not a problem in a particular application, then the current sources $I_Fx$ and the switches Sx may be both replaced by resistors. For example, FIG. 2D is a variation of the circuit shown in FIG. 2A, showing resistors R1-R5 (generically, Rx) in place of the current sources $I_Fx$ and switches Sx. Assuming that all resistors Rx have the same value, the initial voltages across fly capacitors $C_{F1}$ and $C_{F2}$ when fully charged would be $\frac{1}{3}*V_{IN}$ and $\frac{2}{3}*V_{IN}$, respectively, when power switches M1-M6 are all OFF at the initial startup. After fly capacitors $C_{F1}$ and $C_{F2}$ are fully charged, power switches M1 and M2 can turn ON, forcing the bottom plates of fly capacitors $C_{F1}$ and $C_{F2}$ to ground, reducing the charge on fly capacitors $C_{F1}$ and $C_{F2}$ to $\frac{1}{3}*V_{IN}$ and $\frac{2}{3}*V_{IN}$, respectively, which are their target values in this example. Note that the resistor-based embodiment works best when 3 out of the 6 Mn switches are turned ON and the other 3 Mn switches are concurrently turned OFF, which is the case during normal switching operation.

After $V_{IN}$ ramps up and the bootstrap capacitors Cn are charged above a minimum value, digital control signals from a controller (see, for example, FIG. 4) and corresponding to switches S1-S6 cause the fly capacitors $C_{F1}$ and $C_{F2}$ to be charged or discharged to target voltages. For example, FIG. 2B is a schematic diagram showing the circuit of FIG. 2A in a first switch state that charges the fly capacitors $C_{Fx}$. With all power switches Mn in an OFF (open) state, switches S1 and S2 and switches S4 and S5 are closed, and switches S3 and S6 are opened, thus coupling both the fly capacitors $C_{Fx}$ between $V_{IN}$ and the reference potential, thereby enabling the fly capacitors $C_{Fx}$ to charge. In some embodiments, if $V_{IN}$ is current limited, then the fly capacitors $C_{Fx}$ may be sequentially charged, for example, by first closing switches S1 and S2 (all other switches Sx being open) until fly capacitor $C_{F2}$ is charged, then closing switches S4 and S5 (all other switches Sx being open) until fly capacitor $C_{F1}$ is charged.

Note that switchable current sources $I_F2/S2$ and $I_F5/S5$ provide current paths for the fly capacitor $C_{Fx}$ charging current to pass to the reference potential so that the output capacitor $C_{OUT}$ does not get significantly charged through body diodes D2b and D3b. $C_{OUT}$ may be slightly charged or discharged by any current imbalance between $I_FA$ and $I_{F2}$, and/or $I_F4$ and $I_F5$. Accordingly, the current source pair $I_FA$ and $I_{F2}$ and the current source pair $I_F4$ and $I_F5$ are preferably matched to reduce or eliminate stray current paths through body diodes D2b and D3b from charging $C_{OUT}$.

The charge level on each fly capacitor $C_{Fx}$ would generally be measured by an associated voltage detector which provides voltage information (typically after conversion from analog to digital form) to a controller operating the switches Sx. Once the fly capacitors $C_{Fx}$ are charged, all of the switches Sx would generally be opened. Charge on the fly capacitors $C_{Fx}$ would then normally be maintained by operation of the power switches Mn.

Figure 2C:
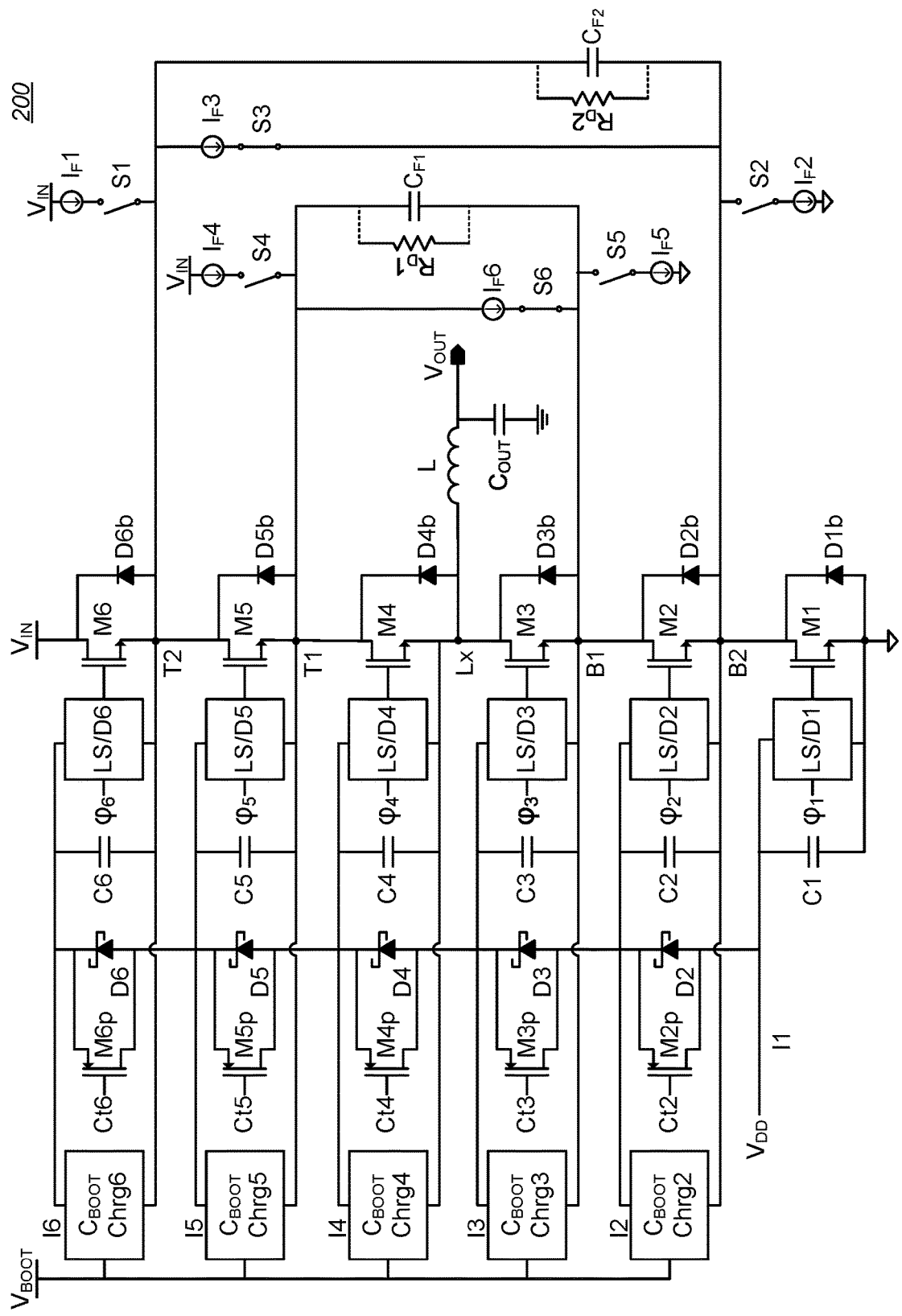
FIG. 2C is a schematic diagram showing the circuit of FIG. 2A in a second switch state that discharges the fly capacitors $C_{Fx}$.
Figure 2D:
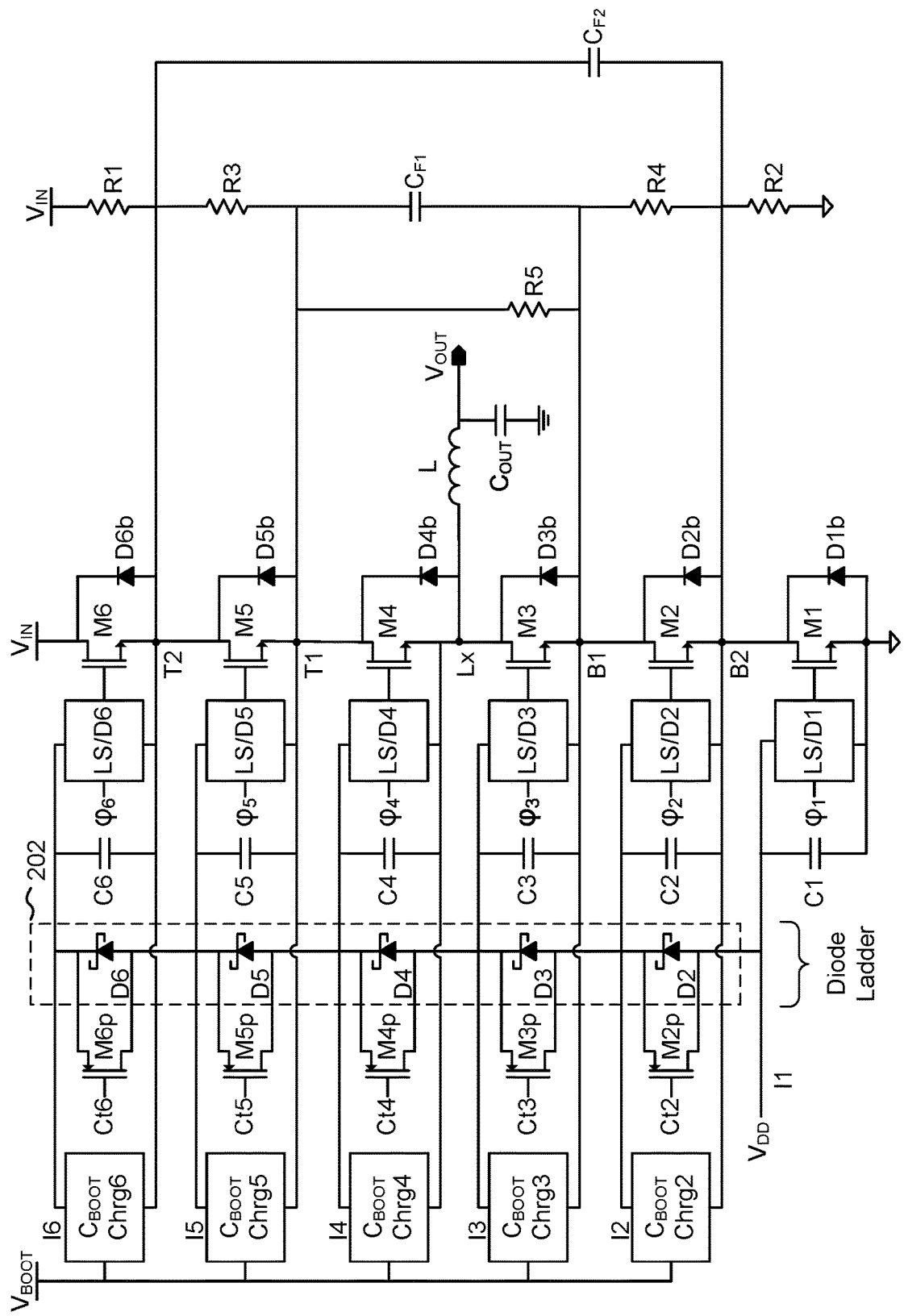
FIG. 2D is a variation of the circuit shown in FIG. 2A, showing resistors R1-R6 (generically, Rx) replacing respective pairs of current sources $I_Fx$ and switches Sx.

FIG. 2C is a schematic diagram showing the circuit of FIG. 2A in a second switch state that discharges the fly capacitors $C_{Fx}$. In the illustrated example, switches S3 and S6 are closed and all other switches Sx are open, thus coupling the respective top and bottom plates of the fly capacitors $C_{Fx}$ through the associated current sources $I_{F3}$ and $I_{F6}$. In some embodiments, the fly capacitors $C_{Fx}$ may be sequentially discharged.

If $C_{OUT}$ is pre-charged but $V_{OUT}$ is below a target level, it may be useful to allow the charging current for the fly capacitors $C_{Fx}$ to flow into and charge $C_{OUT}$ by turning power switches M2 and M3 ON and opening switches S2 and S5, or by turning power switch M3 ON and opening switch S5. This assumes that there is enough voltage headroom ($V_{IN}-V_{OUT}$) to charge fly capacitors $C_{F1}$ and/or $C_{F2}$.

Alternatively, if $C_{OUT}$ is pre-charged but $V_{OUT}$ is above a target level, it may be useful to allow the charge on $C_{OUT}$ to flow into and charge the fly capacitors $C_{Fx}$. For example, fly capacitor $C_{F1}$ may be charged from $C_{OUT}$ by turning power switch M4 ON and closing switch S5 (all other switches Sx are being open). Similarly, fly capacitor $C_{F2}$ may be charged from $C_{OUT}$ by turning power switches M4 and M5 ON and closing switch S2 (all other switches Sx are being open). This assumes that there is enough $V_{OUT}$ voltage headroom to charge fly capacitors $C_{F1}$ and/or $C_{F2}$.

If the large-value optional discharge resistors $R_D1$ and $R_D2$ are included, they can serve to slowly discharge fly capacitors $C_{F1}$ and $C_{F2}$, respectively, if the power switches are OFF and switches S1 and S4 are open.

Note that with the charging functionality provided by the switchable current sources $I_Fx/Sx$, $V_{OUT}$ can in general be pre-biased at any voltage between $V_{IN}$ and 0V, and discharge during startup is not necessary. However, one limitation of the buck converter configuration is that $V_{OUT}$ must always be between $V_{IN}$ and 0V, so if $V_{IN}=0V$, then $C_{OUT}$ and the fly capacitors $C_{Fx}$ must be discharged to (or close to) the reference potential (e.g., circuit ground) in order to not turn on the body diodes Dnb of the NFET power switches Mn and allow current to flow backwards into the $V_{IN}$ terminal. If the optional discharge resistors $R_D1$ and $R_D2$ are present, then the fly capacitors $C_{Fx}$ will be slowly discharged (the body diodes Dnb of the power switches Mn will also discharge the fly capacitors $C_{Fx}$, but up to a point and not all the way to 0V). Note that $C_{OUT}$ may be discharged close to 0V (within 3 diode drops in the illustrated example) through body diode D4b by closing switches S6 and S5.

The initial phases of the startup process ends when the bootstrap capacitors Cn and fly capacitors $C_{Fx}$ are charged, allowing a "soft" startup phase to begin in which the NFET power switches Mn are operated to fully charge $C_{OUT}$ but in a limited current manner to protect the NFET power switches Mn from excess current inflow.

Shutdown Modes

Shutdown of a converter cell 200 involves cessation of normal switching operation of the power switches Mn, and may occur because a circuit within a product, or the product itself (e.g., a cellphone) is being turned OFF and no longer needs power.

One shutdown mode includes the following phases, some of which may be concurrently performed, triggered by reception of a shutdown signal or command to a controller (for example, the control circuitry 400 shown in FIG. 4 below): $V_{IN}$ and $V_{DD}$ are turned OFF, resulting in a relatively slow discharge; all power switches Mn are set by the control circuitry to an OFF state (noting that as the voltages $V_{CAPn}$ on the bootstrap capacitors Cn drain down, the associated resistors Rn, if present, keep the power switches Mn in OFF states); if a charge pump or the like is used to generate $V_{BOOT}$, then disable that circuit; shut off the bias current $I_{BIAS}$ flowing from $V_{IN}$ to the bootstrap capacitors Cn (noting that the $C_{BOOT}$ CHRGn circuits provide an internal discharge current path to drain the charge on bootstrap capacitors C4-C8); and set the switches Sx to a discharge configuration, as described above.

As noted above, if the large-value optional discharge resistors $R_D1$ and $R_D2$ are included (see, FIG. 2A for example), they will serve to discharge fly capacitors $C_{F1}$ and $C_{F2}$ to 0V, since the power switches are OFF and switches S1 and S4 are open in the discharge configuration. It is also possible to only open switches S1, S3, and S4 while closing switches S2 and S5 to weakly pull the bottom of the fly capacitors $C_{F1}$ and $C_{F2}$ to ground; then, along with resistors $R_D1$ and $R_D2$, all the node voltages will be pulled to GND.

If there is any special requirement in a particular application to have a disable/standby mode where a quick startup can happen without the need to charge the fly capacitors $C_{Fx}$ and/or the output capacitor $C_{FLY}$, then an alternative shutdown mode may be used. One such alternative shutdown mode includes the following phases, some of which may be concurrently performed, triggered by reception of a disable or standby signal or command to a controller (for example, the control circuitry 400 shown in FIG. 4 below): all power switches Mn are set by the control circuitry to an OFF state; and keep $V_{DD}$ ON and keep the $C_{BOOT}$ CHRGn circuits operational to maintain the voltages $V_{CAPn}$ on the bootstrap capacitors Cn (thus, $V_{BOOT}$ is still available). Note that the charge balance functions of the control circuitry to maintain desired target voltages on the fly capacitors $C_{Fx}$ may optionally be enabled or disabled, depending on the startup speed requirements.

Simplified Embodiment

In applications which $C_{OUT}$ and the fly capacitors $C_{Fx}$ are specified to always startup from 0V and always discharged to 0V after shutdown, the following simplifications to the converter cell 200 of FIG. 2A may be made: the diodes Dn in the diode ladder 202 are Schottky diodes to reduce the forward bias voltage drop; and the $C_{BOOT}$ CHRGn circuits may be eliminated (however, in embodiments where the switching pattern is irregular such that an upper switch can switch continuously for a while and a lower switch does not, the charge in the upper switch boot capacitor can be depleted and not replenished via the lower boot capacitor since the lower boot capacitor is not switching as much; in such a case, eliminating the $C_{BOOT}$ CHRGn circuits may not be beneficial). During start-up, as soon as $V_{DD}$ is powered up and power switch M1 is turned ON, then bootstrap capacitors C2-C6 will be charged through diodes D2-D6 because the bottom plates of bootstrap capacitors C2 and C4 are near 0V due to the discharged state of fly capacitor $C_{F2}$ and output capacitor $C_{OUT}$, and the ON state of power switch M1. The bottom plate of fly capacitor $C_{F1}$ will be clamped by the body diode Db3 to $V_{OUT}$. Power switch M2 may be turned ON as soon as there is sufficient voltage on bootstrap capacitor C2, so the bottom plate of fly capacitor $C_{F1}$ is then forced to 0V. One operational restriction is that the drivers 304 in the LS/Dn circuits should be set to an OFF state by the control circuitry when unpowered and held in an OFF state until the bootstrap capacitor Cn voltages ramp up, even if the gate driver input signals are low.

Active Charge Balancing

The circuitry in FIG. 2A may optionally be used to maintain a desired target voltage on each of the fly capacitors $C_{Fx}$ during certain operational states. For example, when a converter cell 200 switches between $V_{IN}$ and circuit ground (GND) in a buck mode, or between $V_{OUT}$ and GND in a boost mode, the fly capacitors $C_{Fx}$ are not used to provide intermediate output voltage levels. More importantly, in such operational modes, the fly capacitors $C_{Fx}$ are not being charged balanced. If this condition persists for a long duration, the voltage across one or more fly capacitors may drift away from a desired target voltage. When the converter cell reverts to generating intermediate output voltage levels that include charge contributions from the fly capacitors $C_{Fx}$, the actual voltage on one or more of the fly capacitors $C_{Fx}$ may deviate significantly from the desired target level, potentially leading to operational issues such as large transients and/or possible over-voltage stress to components.

As a specific example for a 3-level converter (see, e.g., the 3-level DC-to-DC buck converter cell 201 in FIG. 2A), when $V_{OUT}$ approaches $V_{IN}/2$ for a 3-level converter, then $V_{IN}$ and GND would be alternately coupled to $V_{OUT}$ so that the average voltage at $V_{OUT}$ would be about $V_{IN}/2$. For example, the logic signals applied to control upper power switches M4 and M5 would be binary "1" to couple $V_{IN}$ to $V_{OUT}$, and the logic signals applied to control lower power switches M2 and M3 would be binary "0" to couple GND to $V_{OUT}$. Notably, in this mode of operation, the fly capacitor $C_{F1}$ is not used to supply charge to $V_{OUT}$ and $C_{F1}$ is not being charge balanced, so the voltage across fly capacitor $C_{F1}$ may drift away from its target voltage of $V_{IN}/2$.

To overcome this issue, the fly capacitor pre-charge circuitry described above with respect to FIGS. 2A-2D can be enabled to keep the fly capacitor $C_{F1}$ voltage at a desired target by appropriately activating switches S4, S5, and S6. For example, when switches M4 and M5 are enabled (conducting) or when switches M2 and M3 are enabled, then switches S4 and S5 are CLOSED and switch S6 is OPENED in order to charge fly capacitor $C_{F1}$ if needed, and switches S4 and S5 are OPENED and switch S6 is CLOSED in order to discharge fly capacitor $C_{F1}$ if needed. Whether to charge or discharge fly capacitor $C_{F1}$ may be determined by monitoring the voltage across that capacitor (see below regarding HIGH/LOW voltage status signals, $C_{Fx\_H/L}$ from voltage detectors coupled to corresponding fly capacitors $C_{Fx}$).

Because the fly capacitor $C_{F1}$ voltage drift is mostly due to leakage, only a small charging or discharging current is needed, like the currents used during a pre-charge phase. This aspect of the invention scales to higher levels of converter cells, such as the 4-level DC-to-DC buck converter cell 200 of FIG. 2A. For example, in a 4-level converter cell, repeated switching of codes 100 and 011 for switches M6, M5, M4 would leave fly capacitor $C_{F1}$ unbalanced, while repeated switching between codes 110 and 001 for switches M6, M5, M4 would leave fly capacitor $C_{F2}$ unbalanced. The codes represent the switch states of M6, M5, M4 (e.g., "100") and the complements of the codes represent the concurrent switch states of M1, M2, M3 (e.g., "011"). Selectively switching two or more of the Sx switches allows charge rebalancing in such situations.

Example Multi-Level Controller

Figure 4:
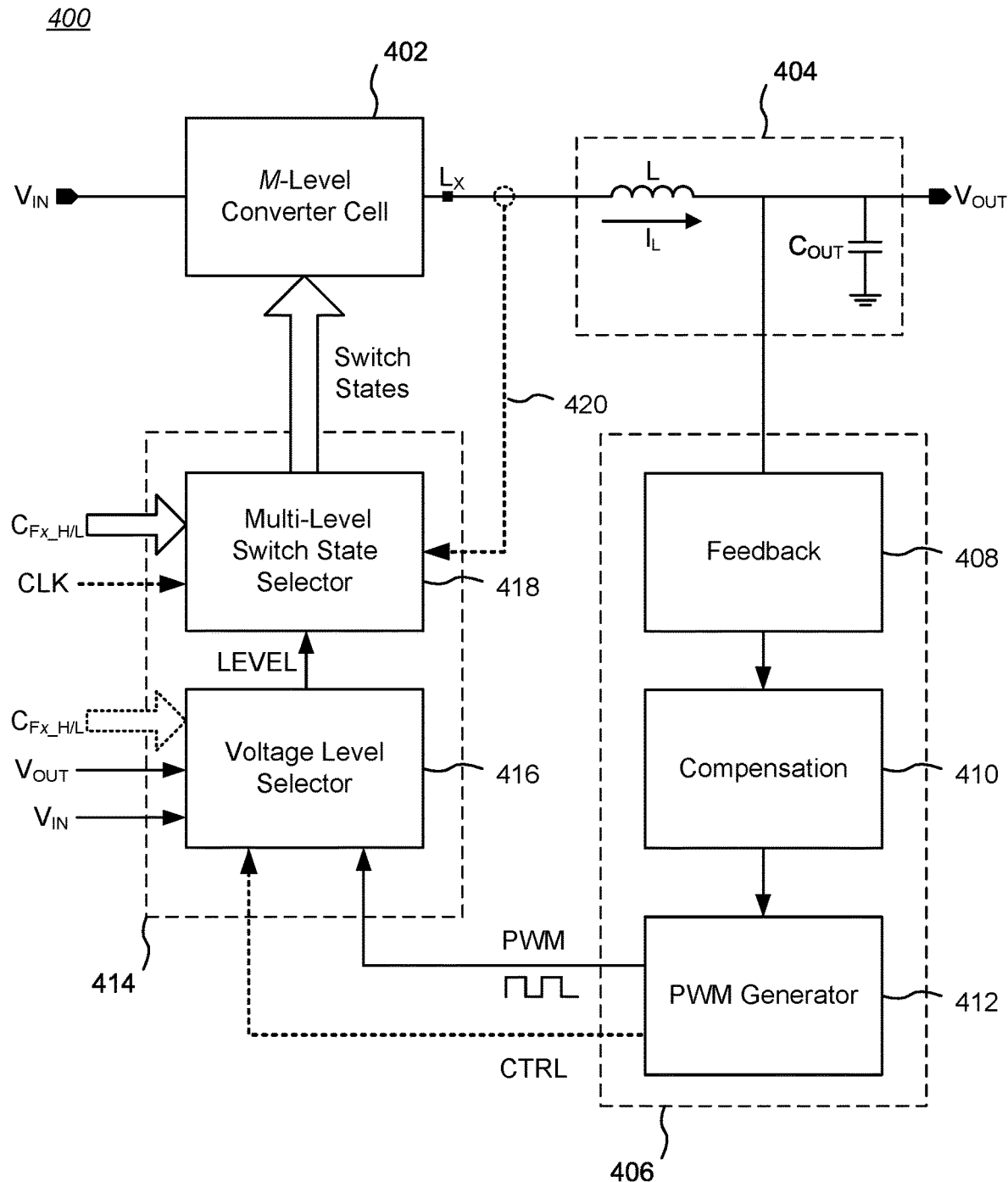
FIG. 4 is a block diagram of one embodiment of control circuitry for an M-level converter cell coupled to an output block comprising an inductor L and an output capacitor $C_{OUT}$.

FIG. 4 is a block diagram of one embodiment of control circuitry 400 for an M-level converter cell 402 coupled to an output block 404 comprising an inductor L and an output capacitor $C_{OUT}$ (conceptually, the inductor L also may be considered as being included within the M-level converter cell 402). This example control circuitry 400 is adapted from the teachings set forth in U.S. patent application Ser. No. 17/560,767, filed Dec. 23, 2021, entitled "Controlling Charge-Balance and Transients in a Multi-Level Power Converter", assigned to the assignee of the present invention, the contents of which are incorporated by reference. However, the present invention may be used in combination with other types of control circuitry for an M-level converter cell 402.

The control circuitry 400 functions as a control loop coupled to the output of the M-level converter cell 402 and to power-switch control inputs of the M-level converter cell 402. In general, the control circuitry 400 is configured to monitor the output (e.g., voltage and/or current) of the M-level converter cell 402 and dynamically generate a set of power-switch control inputs to the M-level converter cell 402 that attempt to stabilize the output voltage and/or current at specified values, taking into account variations of $V_{IN}$ and output load. In alternative embodiments, the control circuitry 400 may be configured to monitor the input of the M-level converter cell 402 (e.g., voltage and/or current) and/or one or more internal nodes of the M-level converter cell 402 (e.g., the voltage across one or more fly capacitors Cx or the current through one or more power switches). Accordingly, most generally, the control circuitry 400 may be configured to monitor the voltage and/or current of a node (e.g., input terminal, internal node, or output terminal) of the M-level converter cell 402. The control circuitry 400 may be incorporated into, or separate from, the overall controller 104 for a power converter 100 embodying the M-level converter cell 402, and portions of the control circuitry 400 may be implemented with a digital micro-controller.

A first block comprises a feedback controller 406, which may be a traditional controller such as a fixed frequency voltage mode or current mode controller, a constant-on-time controller, a hysteretic controller, or any other variant. The feedback controller 406 is shown as being coupled to $V_{OUT}$ from the M-level converter cell 402. In alternative embodiments, the feedback controller 406 may be configured to monitor the input of the M-level converter cell 402 and/or an internal node of the M-level converter cell 402. The feedback controller 406 produces a signal directly or indirectly indicative of the voltage at $V_{OUT}$ that determines in general terms what needs to be done in the M-level converter cell 402 to maintain desired values for $V_{OUT}$: charge, discharge, or tri-state (i.e., open, with no current flow).

In the illustrated example, the feedback controller 406 includes a feedback circuit 408, a compensation circuit 410, and a pulse-width modulation (PWM) generator 412. The feedback circuit 408 may include, for example, a feedback-loop voltage detector which compares $V_{OUT}$ (or an attenuated version of $V_{OUT}$) to a reference voltage which represents a desired $V_{OUT}$ target voltage (which may be dynamic) and outputs a control signal to indicate whether $V_{OUT}$ is above or below the target voltage. The feedback-loop voltage detector may be implemented with a comparison device, such as an operational amplifier (op-amp) or transconductance amplifier (gm amplifier).

The compensation circuit 410 is configured to stabilize the closed-loop response of the feedback controller 406 by avoiding the unintentional creation of positive feedback, which may cause oscillation, and by controlling overshoot and ringing in the step response of the feedback controller 406. The compensation circuit 410 may be implemented in known manner, and may include LC and/or RC circuits.

The PWM generator 412 generates the actual PWM control signal which ultimately sets the duty cycle of the power switches of the M-level converter cell 402. In some embodiments, the PWM generator 412 may pass on additional optional control signals CTRL indicating, for example, the magnitude of the difference between $V_{OUT}$ and the reference voltage (thus indicating that some levels of the M-level converter cell 402 should be bypassed to get to higher or lower levels), and the direction of that difference (e.g., $V_{OUT}$ being greater than or less than the reference voltage). In other embodiments, the optional control signals CTRL can be derived from the output of the compensation circuit 410, or from the output of the feedback circuit 408, or from a separate comparator (not shown) coupled to, for example, $V_{OUT}$. One purpose of the optional control signals CTRL is for advanced control algorithms, when it may be beneficial to know how far away $V_{OUT}$ is from a target output voltage, thus allowing faster charging of the inductor L if the $V_{OUT}$ is severely under regulated.

A second block comprises an M-level controller 414, the primary function of which is to select the power switch states that generate a desired $V_{OUT}$ while maintaining a charge-balance state on the fly capacitors within the M-level converter cell 402 every time an output voltage level is selected, regardless of what power switch state or states were used in the past.

The M-level controller 414 includes a Voltage Level Selector 416 which receives the PWM control signal and the additional control signals CTRL if available. In addition, the Voltage Level Selector 416 may be coupled to $V_{OUT}$ and/or $V_{IN}$, and, in some embodiments, to HIGH/LOW voltage status signals, $C_{Fx\_H/L}$, from voltage detectors coupled to corresponding fly capacitors $C_{Fx}$ within the M-level converter cell 402. A function of the Voltage Level Selector 416 is to translate the received signals to a target output voltage level (e.g., on a cycle-by-cycle basis). The Voltage Level Selector 416 typically will consider at least $V_{OUT}$ and $V_{IN}$ to determine which target level should charge or discharge the output of the M-level converter cell 402 with a desired rate, and may take into account the voltage across each fly capacitor.

The output of the Voltage Level Selector 416 is coupled to an M-level Switch State Selector 418, which generally would be coupled to the voltage status signals, $C_{Fx\_H/L}$, from the capacitor voltage detectors for the fly capacitors $C_{Fx}$. Taking into account the target level generated by the Voltage Level Selector 416, the M-level Switch State Selector 418 determines which power switch states for the desired output level should be preferred for capacitor charge-balance. The output of the M-level Switch State Selector 418 is coupled to the power switches of the M-level converter cell 402 (through appropriate level-shifter circuits and drivers circuits, as may be needed for a particular converter cell) and includes the power switch state settings determined by the M-level Switch State Selector 418 (which selects the configuration of power switches within the M-level converter cell 402 corresponding to a selected target level).

In general (but not always), the Voltage Level Selector 416 and the M-level Switch State Selector 418 only change their states when the PWM signal changes. For example, when the PWM signal goes high, the Voltage Level Selector 416 selects which level results in charging of the inductor L and the M-level Switch State Selector 418 sets which version of switch settings to use for that level. Then when the PWM signal goes low, the Voltage Level Selector 416 selects which level should discharge the inductor L and the M-level Switch State Selector 418 sets which version of that level to use. Thus, the Voltage Level Selector 416 and the M-level Switch State Selector 418 generally only change states when the PWM signal changes (the PWM signal is in effect their clock signal). However, there may be situations or events where it is desirable for the CTRL signals to change the state of the Voltage Level Selector 416. In some embodiments, it may be useful to include a timing function that forces the M-level Switch State Selector 418 to re-evaluate the optimal version of the power switch state periodically, for example, in order to avoid being "stuck" at one level for a very long time, potentially causing charge imbalances.

In embodiments that utilize the teachings set forth in the patent application entitled "Controlling Charge-Balance and Transients in a Multi-Level Power Converter" referenced above, the M-level controller 414 implements a control method for the M-level converter cell 402 that selects an essentially optimal power switch state which moves the fly capacitors $C_{Fx}$ towards a charge-balance state every time a voltage level at the $L_X$ node is selected, regardless of what power switch state or states were used in the past. Accordingly, such multi-level converter circuits are free to select a different power switch state or $L_X$ voltage level every switching cycle without a need to keep track of any prior power switch state or sequence of power switch states.

In some embodiments, the M-level Switch State Selector 418 may take into account the magnitude and/or polarity of current $I_L$ flowing through the inductor L by way of an optional current-measurement input 420, which may be implemented in conventional fashion.

One notable benefit of the control circuitry shown in FIG. 4 is that it enables generation of voltages in boundary zones between voltage levels, which represent unattainable output voltages for conventional multi-level DC-to-DC converter circuits.

While FIG. 4 shows a particular embodiment of control circuitry for an M-level converter cell as modified in accordance with the present invention, it should be appreciated that other control circuits may be adapted or devised to provide suitable switching signals for the power switches within a converter cell while still being able to use embodiments of the present invention.

Circuit Embodiments

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end-product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Figure 5:
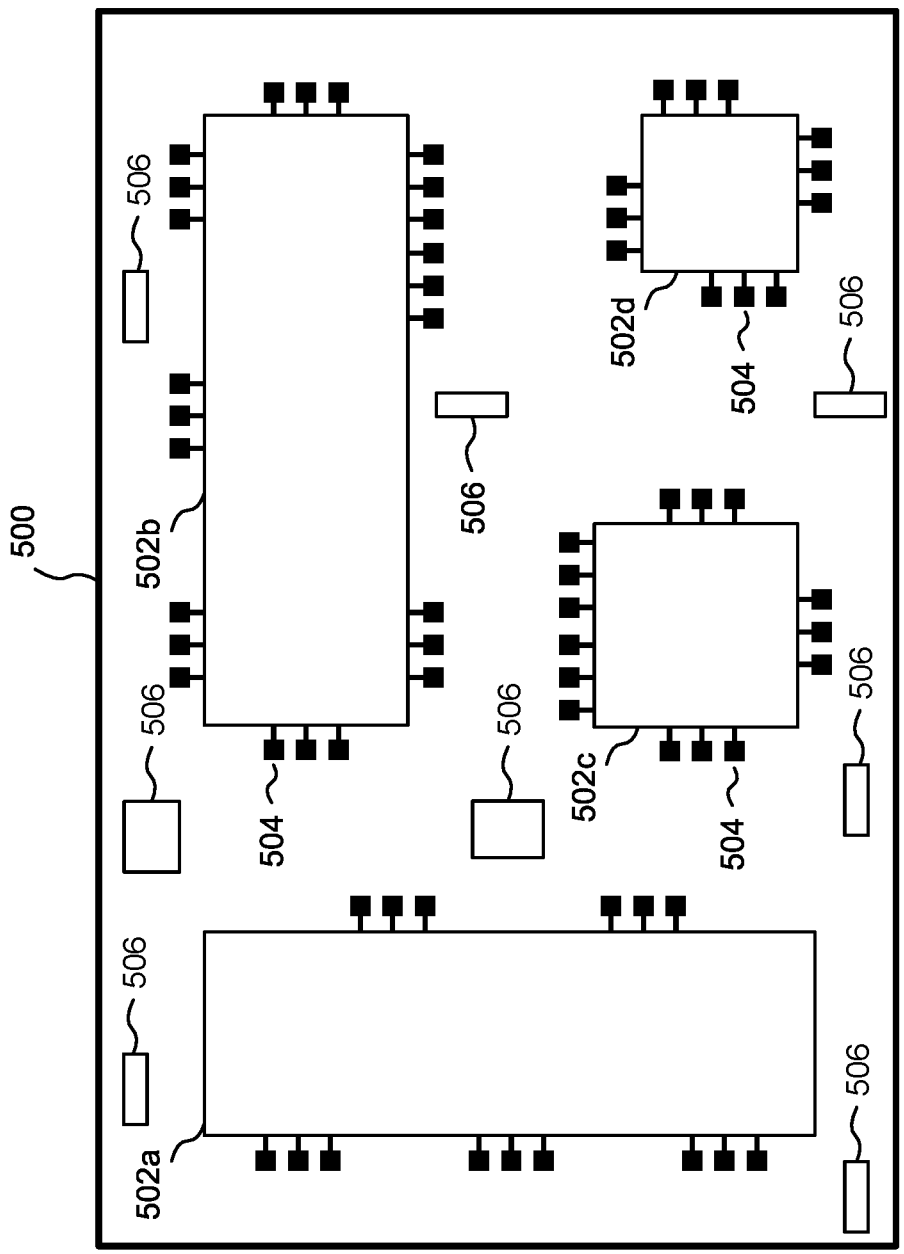
FIG. 5 is a top plan view of a substrate that may be, for example, a printed circuit board or chip module substrate (e.g., a thin-film tile).

As one example of further integration of embodiments of the present invention with other components, FIG. 5 is a top plan view of a substrate 500 that may be, for example, a printed circuit board or chip module substrate (e.g., a thin-film tile). In the illustrated example, the substrate 500 includes multiple ICs 502a-502d having terminal pads 504 which would be interconnected by conductive vias and/or traces on and/or within the substrate 500 or on the opposite (back) surface of the substrate 500 (to avoid clutter, the surface conductive traces are not shown and not all terminal pads are labelled). The ICs 502a-502d may embody, for example, signal switches, active filters, amplifiers (including one or more LNAs), and other circuitry. For example, IC 502b may incorporate one or more instances of the converter cell 200 shown in FIG. 2A and/or the control circuitry 400 shown in FIG. 4.

The substrate 500 may also include one or more passive devices 506 embedded in, formed on, and/or affixed to the substrate 500. While shown as generic rectangles, the passive devices 506 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 500 to other passive devices 506 and/or the individual ICs 502a-502d. The front or back surface of the substrate 500 may be used as a location for the formation of other structures.

Control and Operational Considerations

It may be desirable to provide additional control and operational circuitry (or one or more shutdown procedures) that enables reliable and efficient operation of a power converter utilizing a multi-level converter cell designed in accordance with the present disclosure. For example, in a step-down power converter, the output voltage of a converter cell is less than the input voltage of the converter cell. Shutting down or disabling (e.g., because of a fault event, such as a short) a converter cell having a designed-in inductance connected to the output while the output load current is non-zero generally requires some means for discharging the inductor current. In some embodiments, a bypass switch may be connected in parallel with a designed-in inductance connected to the output of a converter cell and controlled to be open during normal operation and closed when shutting down the converter cell or if a fault event occurs. Ideally, in order to prevent transient ringing and to provide safe discharge of the inductor current, the bypass switch can be closed before disabling converter cell switching. In alternative embodiments using MOSFETs for the main power switches of the converter, the inherent body diode connected between the body and drain terminals of each MOSFET can also discharge the inductor current. Details of these solutions, as well as alternative shutdown solutions, are taught in U.S. Pat. No. 10,686,367, issued Jun. 16, 2020, entitled "Apparatus and Method for Efficient Shutdown of Adiabatic Charge Pumps", assigned to the assignee of the present invention, the contents of which are incorporated by reference.

Another consideration when combining converter cells in parallel is controlling multiple parallel power converters in order to avoid in-rush current (e.g., during a soft-start period for the power converters) and/or power switch over-stress if all of the power converters are not fully operational, such as during startup or when a fault condition occurs. Conditional control may be accomplished by using node status detectors coupled to selected nodes within parallel-connected power converters to monitor voltage and/or current. Such node status detectors may be configured in some embodiments to work in parallel with an output status detector measuring the output voltage of an associated power converter during startup. The node status detectors ensure that voltages across important components (e.g., fly capacitors and/or power switches) within the converter cell(s) of the power converters are within desired ranges before enabling full power steady-state operation of the parallel power converters, and otherwise prevent full power steady-state operation. The node status detectors may be coupled to a master controller that controls one or more of the parallel power converters using one or more common control signals. In furtherance of a master controller configuration, the parallel power converters may each report a power good signal (Pgood) when ready to leave a startup phase for full power steady-state operation. The master controller may essentially "AND" all such Pgood signals together, possibly along with one or more status signals from other circuits, such that the master controller does not enable full power steady-state operation of any the parallel power converter unless all of the parallel power converters are ready for that state. In essence, the Pgood signals from each parallel power converter are all tied together such that the parallel power converters may not transition out of startup phase until all the Pgood signals indicate that they are ready to transition to steady operation. Furthermore, if the Pgood signal changes due to a fault condition in one or more of the parallel power converters, the parallel power converters can transition from a steady state operation to an auto-restart or shutdown operation. Details of these solutions, as well as alternative shutdown solutions, are taught in U.S. Pat. No. 10,992,226, issued Apr. 27, 2021, entitled "Startup Detection for Parallel Power Converters", assigned to the assignee of the present invention, the contents of which are incorporated by reference.

Another consideration in operating multi-level converter cells is attaining (i.e., pre-charging) and maintaining fly capacitor voltages that are essentially fully proportionally balanced so that all power switches are subjected to a similar voltage stress, since unbalanced fly capacitors can lead to breakdown of a power switch (particularly FET power switches) due to exposure to high voltages. One solution to both pre-charging capacitor voltages and operational balancing of capacitor voltages in a multi-level DC-to-DC converter circuit is to provide a parallel "shadow" circuit that conditionally couples a fly capacitor to a voltage source or other circuit to pre-charge that capacitor, or conditionally couples two or more fly capacitors together to transfer charge from a higher voltage capacitor to a lower voltage capacitor, or conditionally couples a fly capacitor to a voltage sink to discharge that capacitor, all under the control of real-time capacitor voltage measurements. Each parallel "shadow" circuit may comprise a switch and a resistor coupled in parallel with a main power switch that is part of a multi-level converter cell (in some cases, one switch-resistor pair may span two series-connected power switches). This particular solution for pre-charging and/or balancing charge on fly capacitors is very fast, provides slow pre-charging of the fly capacitors during a pre-charge period, protects power switches from in-rush current, and provides stable voltages for converter cell power switches. Details of this solution, as well as alternative pre-charging and charge balancing solutions, are taught in U.S. Pat. No. 10,720,843, issued Jul. 21, 2020, entitled "Multi-Level DC-DC Converter with Lossy Voltage Balancing", assigned to the assignee of the present invention, the contents of which are incorporated by reference.

Another solution to balancing capacitor voltages in a multi-level DC-to-DC converter circuit is to provide a lossless voltage balancing solution where out-of-order state transitions of a multi-level DC-to-DC converter cell are allowed to take place during normal operation. The net effect of out-of-order state transitions is to increase or decrease the voltage across specific fly capacitors, thus preventing voltage overstress on the main power switches of the DC-to-DC converter. In some embodiments, restrictions are placed on the overall sequence of state transitions to reduce or avoid transition state toggling, thereby allowing each capacitor an opportunity to have its voltage steered as necessary, rather than allowing one capacitor to be voltage balanced before voltage balancing another capacitor. Details of this solution, as well as alternative charge balancing solutions, are taught in U.S. Pat. No. 10,770,974, issued Sep. 8, 2020, entitled "Multi-Level DC-DC Converter with Lossless Voltage Balancing", assigned to the assignee of the present invention, the contents of which are incorporated by reference.

An additional consideration for some embodiments is enabling operation of multi-level converter cells such that voltages can be generated in boundaries zones between voltage levels. "Boundary zones" represent unattainable output voltages for conventional multi-level DC-to-DC converter circuits. In order to generate output voltages within a boundary zone, some embodiments essentially alternate (toggle) among adjacent (or even nearby) zones by setting states of the converter cell power switches in a boundary zone transition pattern. For example, a 3-level DC-to-DC converter circuit may operate in Zone 1 for a selected time and in adjacent Zone 2 for a selected time. Thus, Zones 1 and 2 are treated as a single "super-zone". More generally, in some cases, it may be useful to create super-zones using non-adjacent zones or using more than two zones (adjacent and/or non-adjacent). Details of this solution are taught in U.S. Pat. No. 10,720,842, issued Jul. 21, 2020, entitled "Multi-Level DC-DC Converter with Boundary Transition Control", assigned to the assignee of the present invention, the contents of which are incorporated by reference.

Yet another consideration for some embodiments is protection of the main power switches and other components within a power converter from stress conditions, particular from voltages that exceed the breakdown voltage of such power switches (particularly FET switches). One means for protecting a multi-level power converter uses at least one high-voltage FET power switch while allowing all or most other main power switches to be low-voltage FET switches.

In power converters, particularly multi-level power converters, the power switches may be implemented with FETs, especially MOSFETs. For each power FET, a driver circuit is generally required. In addition, for some power FETs, a level shifter may be required to translate ground-referenced low-voltage logic ON/OFF signals from an analog or digital controller into a signal with the same voltage swing but referenced to the source voltage of the power FET that the signal is driving in order to charge or discharge the gate of the power FET and thereby control the conducting or blocking state of the power FET. In some applications, the functions of a level shifter and a driver circuit may be incorporated into one circuit.

As should be clear, the multi-level power converter embodiments described in this disclosure may be synergistically combined with the teachings of one or more of the additional control and operational circuits and methods described in this section.

General Benefits and Advantages of Multi-Level Power Converters

Embodiments of the current invention improve the power density and/or power efficiency of incorporating circuits and circuit modules or blocks. As a person of ordinary skill in the art should understand, a system architecture is beneficially impacted utilizing embodiments of the current invention in critical ways, including lower power and/or longer battery life. The current invention therefore specifically encompasses system-level embodiments that are creatively enabled by inclusion in a large system design and application.

More particularly, multi-level power converters provide or enable numerous benefits and advantages, including:

adaptability to applications in which input and/or output voltages may have a wide dynamic-range (e.g., varying battery input voltage levels, varying output voltages);

efficiency improvements on the run-time of devices operating on portable electrical energy sources (batteries, generators or fuel cells using liquid or gaseous fuels, solar cells, etc.);

efficiency improvements where efficiency is important for thermal management, particularly to protect other components (e.g., displays, nearby ICs) from excessive heat;

enabling design optimizations for power efficiency, power density, and form-factor of the power converter—for example, smaller-size multi-level power converters may allow placing power converters in close proximity to loads, thus increasing efficiency, and/or to lower an overall bill of materials;

the ability to take advantage of the performance of smaller, low voltage transistors;

adaptability to applications in which power sources can vary widely, such as batteries, other power converters, generators or fuel cells using liquid or gaseous fuels, solar cells, line voltage (AC), and DC voltage sources (e.g., USB, USB-C, power-over Ethernet, etc.);

adaptability to applications in which loads may vary widely, such as ICs in general (including microprocessors and memory ICs), electrical motors and actuators, transducers, sensors, and displays (e.g., LCDs and LEDs of all types);

the ability to be implemented in a number of IC technologies (e.g., MOSFETs, GaN, GaAs, and bulk silicon) and packaging technologies (e.g., flip chips, ball-grid arrays, wafer level scale chip packages, wide-fan out packaging, and embedded packaging).

The advantages and benefits of multi-level power converters enable usage in a wide array of applications. For example, applications of multi-level power converters include portable and mobile computing and/or communication products and components (e.g., notebook computers, ultra-book computers, tablet devices, and cell phones), displays (e.g., LCDs, LEDs), radio-based devices and systems (e.g., cellular systems, WiFi, Bluetooth, Zigbee, Z-Wave, and GPS-based devices), wired network devices and systems, data centers (e.g., for battery-backup systems and/or power conversion for processing systems and/or electronic/optical networking systems), internet-of-things (IoT) devices (e.g., smart switches and lights, safety sensors, and security cameras), household appliances and electronics (e.g., set-top boxes, battery-operated vacuum cleaners, appliances with built-in radio transceivers such as washers, dryers, and refrigerators), AC/DC power converters, electric vehicles of all types (e.g., for drive trains, control systems, and/or infotainment systems), and other devices and systems that utilize portable electricity generating sources and/or require power conversion.

Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, 6G, and WiFi (e.g., 802.11a, b, g, ac, ax, be) protocols, as well as other radio communication standards and protocols.

Methods

Figure 6:
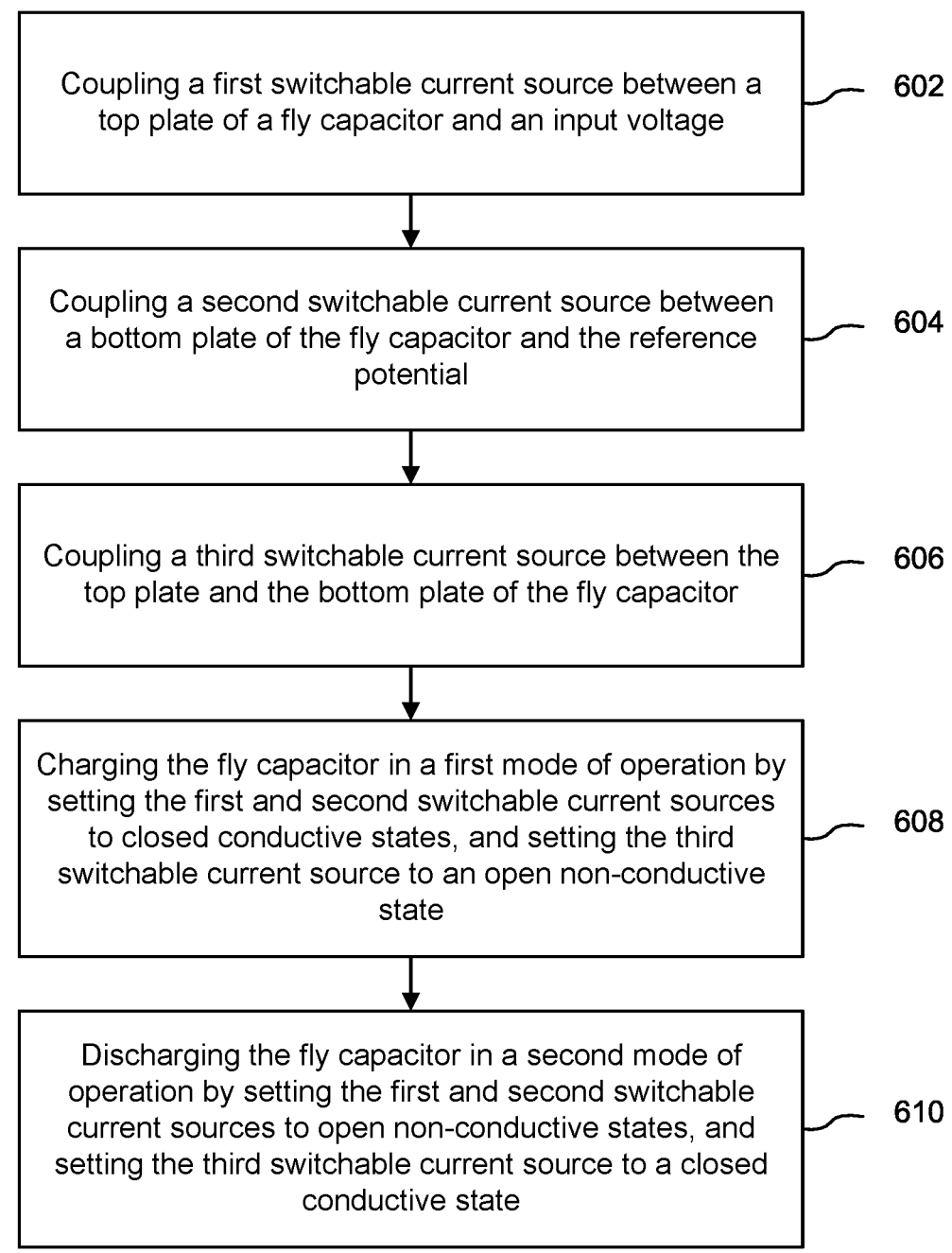
FIG. 6 is a process flow chart showing one method of charging and discharging a fly capacitor of an M-level power converter cell having a set of n power switches coupled in series and configured to be coupled between an input voltage and a reference potential, where M≥3 and n≥4.

Another aspect of the invention includes methods for charging a set of n boot capacitors and/or of charging and discharging a fly capacitor of a converter cell 200. For example, FIG. 6 is a process flow chart 600 showing one method of charging and discharging a fly capacitor of an M-level power converter cell having a set of n power switches coupled in series and configured to be coupled between an input voltage and a reference potential, where $M \geq 3$ and $n \geq 4$. The method includes: coupling a first switchable current source between a top plate of the fly capacitor and the input voltage (Block 602); coupling a second switchable current source between a bottom plate of the fly capacitor and the reference potential (Block 604); coupling a third switchable current source between the top plate and the bottom plate of the fly capacitor (Block 606); charging the fly capacitor in a first mode of operation by setting the first and second switchable current sources to closed conductive states, and setting the third switchable current source to an open non-conductive state (Block 608); and discharging the fly capacitor in a second mode of operation by setting the first and second switchable current sources to open non-conductive states, and setting the third switchable current source to a closed conductive state (Block 610).

Figure 7:
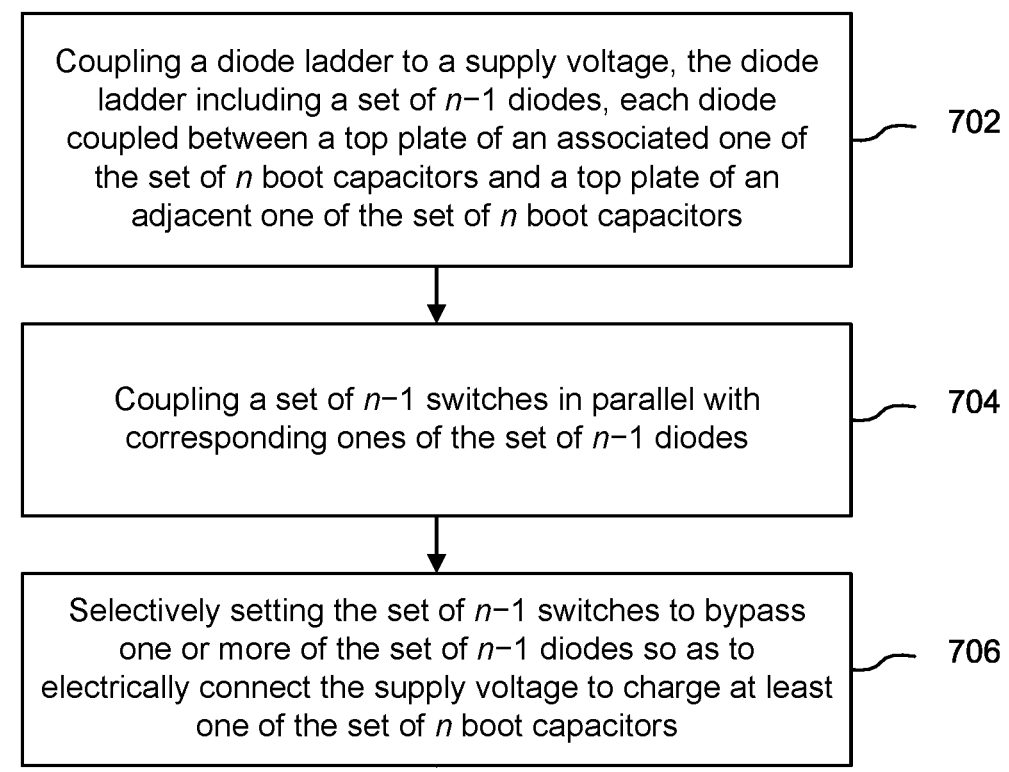
FIG. 7 is a process flow chart showing a first method of charging a set of n boot capacitors of an M-level power converter cell having a set of n power switches coupled in series and configured to be coupled between an input voltage and a reference potential, where M≥3 and n≥4.

As another example, FIG. 7 is a process flow chart 700 showing a first method of charging a set of n boot capacitors of an M-level power converter cell having a set of n power switches coupled in series and configured to be coupled between an input voltage and a reference potential, where M≥3 and n≥4, the method including: coupling a diode ladder to a supply voltage, the diode ladder including a set of n−1 diodes, each diode coupled between a top plate of an associated one of the set of n boot capacitors and a top plate of an adjacent one of the set of n boot capacitors (Block 702); coupling a set of n−1 switches in parallel with corresponding ones of the set of n−1 diodes (Block 704); and selectively setting the set of n−1 switches to bypass one or more of the set of n−1 diodes so as to electrically connect the supply voltage to charge at least one of the set of n boot capacitors (Block 706).

Figure 8:
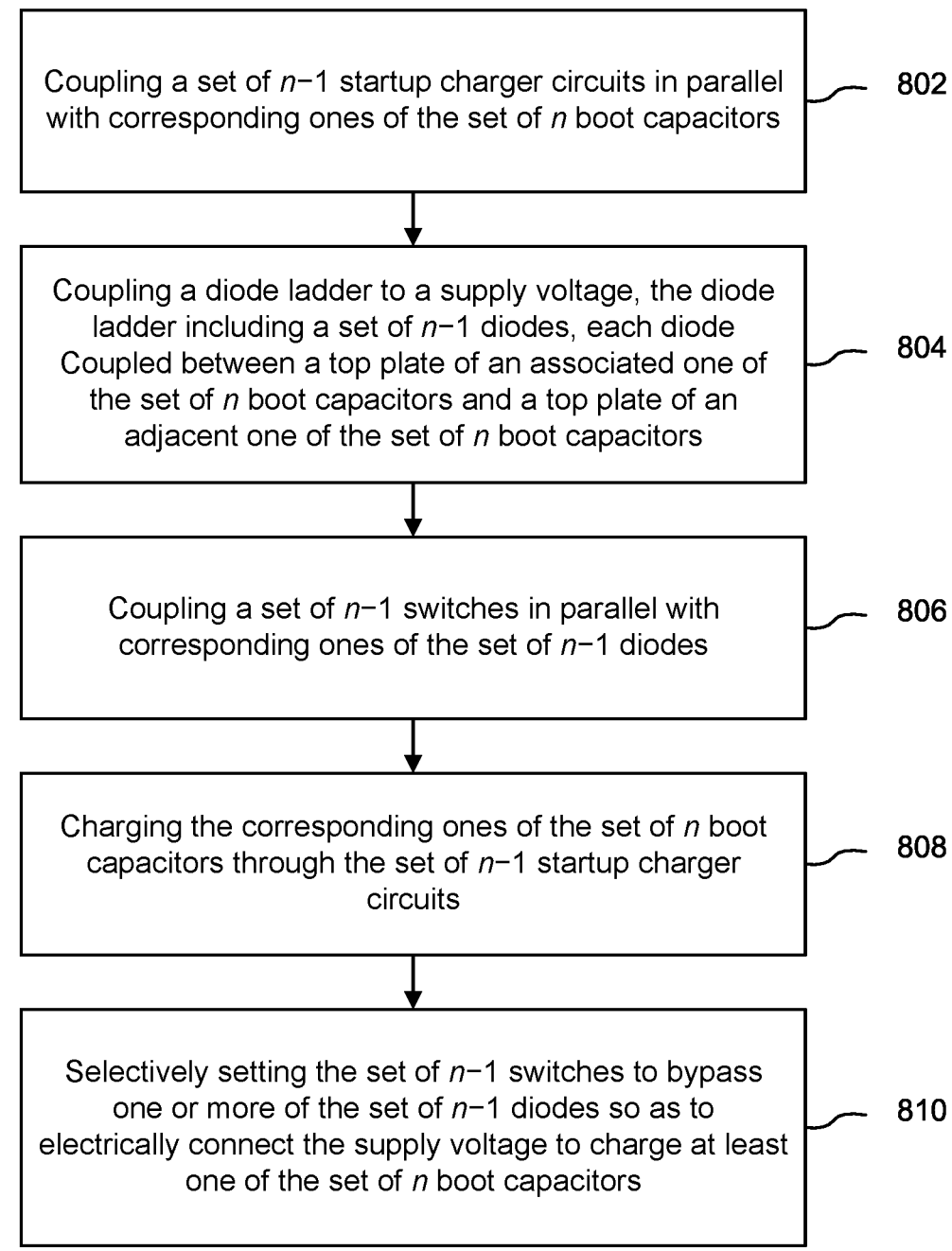
FIG. 8 is a process flow chart showing a second method of charging a set of n boot capacitors of an M-level power converter cell having a set of n power switches coupled in series and configured to be coupled between an input voltage and a reference potential, where M≥3 and n≥4.

As yet another example, FIG. 8 is a process flow chart 800 showing a second method of charging a set of n boot capacitors of an M-level power converter cell having a set of n power switches coupled in series and configured to be coupled between an input voltage and a reference potential, where M≥3 and n≥4, the method including: coupling a set of n−1 startup charger circuits in parallel with corresponding ones of the set of n boot capacitors (Block 802); coupling a diode ladder to a supply voltage, the diode ladder including a set of n−1 diodes, each diode coupled between a top plate of an associated one of the set of n boot capacitors and a top plate of an adjacent one of the set of n boot capacitors (Block 804); coupling a set of n−1 switches in parallel with corresponding ones of the set of n−1 diodes (Block 806); charging the corresponding ones of the set of n boot capacitors through the set of n−1 startup charger circuits (Block 808); and selectively setting the set of n−1 switches to bypass one or more of the set of n−1 diodes so as to electrically connect the supply voltage to charge at least one of the set of n boot capacitors (Block 810).

An additional aspect of the above methods may include combining the steps shown in FIGS. 6 and 8 in a method for charging a set of n boot capacitors and for charging and discharging a fly capacitor.

Fabrication Technologies & Options

In some embodiments, the NFET power switches Mn may be fabricated on a separate integrated circuit die from the LS/Dn circuits and other circuitry shown in FIG. 2A.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions may be greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, MESFET, InP HBT, InP HEMT, FinFET, GAAFET, and SiC-based device technologies, using 2-D, 2.5-D, and 3-D structures. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A circuit including:
   (a) an M-level power converter cell having a set of n power switches coupled in series and configured to be coupled between an input voltage and a reference potential, where M≥3 and n≥4;
   (b) an output capacitor coupled to a node between an adjacent pair of the set of n power switches and to the reference potential;
   (c) one or more fly capacitors coupled to the set of n power switches, each having a top plate and a bottom plate; and
   (d) for each of the one or more fly capacitors:
      (1) a first switchable current source coupled to the top plate of the fly capacitor and configured to be coupled to the input voltage;
      (2) a second switchable current source coupled to the bottom plate of the fly capacitor and configured to be coupled to the reference potential; and
      (3) a third switchable current source coupled between the top plate and the bottom plate of the fly capacitor;
      wherein the first, second, and third switchable current source are configured to charge the fly capacitor in a first mode of operation, and to discharge the fly capacitor in a second mode of operation.

2. The invention of claim 1, wherein the power switches comprise N-type field effect transistors.

3. The invention of claim 1, further including an inductor coupled between the output capacitor and the node.

4. The invention of claim 1, further including a resistor coupled in parallel with at least one of the one or more fly capacitors.

5. The invention of claim 1, wherein at least one switchable current source includes a current source and a switch coupled in series.

6. The invention of claim 1, wherein at least one switchable current source includes a resistor and a switch coupled in series.

7. A circuit including:
   (a) an M-level power converter cell having a set of n power switches coupled in series and configured to be coupled between an input voltage and a reference potential, each power switch having a control gate, where M≥3 and n≥4;
   (b) an output capacitor coupled to a node between an adjacent pair of the set of n power switches and to the reference potential;
   (c) one or more fly capacitors coupled to the set of n power switches, each having a top plate and a bottom plate;
   (d) a set of n driver circuits each coupled to the control gate of an associated one of the set of n power switches;
   (e) a set of n boot capacitors each coupled to an associated one of the set of n driver circuits and having a top plate and a bottom plate;
   (f) a set of n−1 startup charger circuits, each coupled in parallel with an associated one of the set of n boot capacitors, and to a supply voltage, and configured to provide charge to the associated one of the set of n boot capacitors in a first phase of startup operation;
   (g) a diode ladder coupled to a supply voltage and including a set of n−1 diodes, each diode coupled between the top plate of an associated one of the set of n boot capacitors and the top plate of an adjacent one of the set of n boot capacitors, and configured to provide charge to the associated one of the set of n boot capacitors in a second phase of startup operation and during normal operation of the M-level power converter cell;
   (h) a set of n−1 switches, each coupled in parallel with an associated one of the set of n−1 diodes and configured to selectively bypass the associated one of the set of n−1 diodes.

8. The invention of claim 7, wherein the diodes are Schottky diodes.

9. The invention of claim 7, wherein at least one of the set of n driver circuits includes a level shifter.

10. The invention of claim 7, wherein the set of n−1 switches comprise P-type field effect transistors.

11. The invention of claim 7, wherein the power switches comprise N-type field effect transistors.

12. The invention of claim 7, further including an inductor coupled between the output capacitor and the node.

13. The invention of claim 7, further including a resistor coupled in parallel with at least one of the one or more fly capacitors.

14. The invention of claim 7, further including, for each of the one or more fly capacitors:
   (a) a first switchable current source coupled to the top plate of the fly capacitor and configured to be coupled to the input voltage;
   (b) a second switchable current source coupled to the bottom plate of the fly capacitor and configured to be coupled to the reference potential; and
   (c) a third switchable current source coupled between the top plate and the bottom plate of the fly capacitor;
   wherein the first, second, and third switchable current source are configured to charge the fly capacitor in a first mode of operation, and to discharge the fly capacitor in a second mode of operation.

15. The invention of claim 14, wherein at least one switchable current source includes a current source and a switch coupled in series.

16. The invention of claim 14, wherein at least one switchable current source includes a resistor and a switch coupled in series.

17. A method of charging and discharging a fly capacitor of an M-level power converter cell having a set of n power switches coupled in series and configured to be coupled between an input voltage and a reference potential, where M≥3 and n≥4, the method including:
   (a) coupling a first switchable current source between a top plate of the fly capacitor and the input voltage;
   (b) coupling a second switchable current source between a bottom plate of the fly capacitor and the reference potential;
   (c) coupling a third switchable current source between the top plate and the bottom plate of the fly capacitor;
   (d) charging the fly capacitor in a first mode of operation by setting the first and second switchable current sources to closed conductive states, and setting the third switchable current source to an open non-conductive state; and
   (e) discharging the fly capacitor in a second mode of operation by setting the first and second switchable current sources to open non-conductive states, and setting the third switchable current source to a closed conductive state.

* * * * *

UNITED STATES PATENT AND TRADEMARK OFFICE
CERTIFICATE OF CORRECTION

Page 1 of 1

PATENT NO. : 12,381,478 B2
APPLICATION NO. : 18/322330
DATED : August 5, 2025
INVENTOR(S) : Gary Chunshien Wu and Gregory Szczeszynski It is certified that error appears in the above-identified patent and that said Letters Patent is hereby corrected as shown below:

In the Specification

Column 10, Line 27, change "between $I_FA$ and $I_{F2}$," to --between $I_F1$ and $I_F2$,--.

Column 10, Line 28, change "source pair $I_FA$" to --source pair $I_F1$--.

Signed and Sealed this
Twenty-third Day of September, 2025

John A. Squires
*Director of the United States Patent and Trademark Office*